US008633905B2

(12) United States Patent
Harada et al.

(10) Patent No.: US 8,633,905 B2
(45) Date of Patent: Jan. 21, 2014

(54) TOUCH SENSOR, DISPLAY AND ELECTRONIC UNIT

(75) Inventors: Tsutomu Harada, Aichi (JP); Kouji Noguchi, Kanagawa (JP); Yoshitoshi Kida, Aichi (JP); Koji Ishizaki, Aichi (JP); Takayuki Nakanishi, Aichi (JP); Takeya Takeuchi, Aichi (JP)

(73) Assignee: Japan Display West, Inc., Chita (JP)

( * ) Notice: Subject to any disclaimer, the term of this patent is extended or adjusted under 35 U.S.C. 154(b) by 664 days.

(21) Appl. No.: 12/790,146

(22) Filed: May 28, 2010

(65) Prior Publication Data

US 2010/0328239 A1 Dec. 30, 2010

(30) Foreign Application Priority Data

Jun. 29, 2009 (JP) .................................. 2009-154209

(51) Int. Cl.
*G06F 3/041* (2006.01)
(52) U.S. Cl.
USPC .......................................... 345/173; 345/174
(58) Field of Classification Search
USPC ................................................ 345/173–183
See application file for complete search history.

(56) References Cited

U.S. PATENT DOCUMENTS

| 4,293,734 A | 10/1981 | Pepper, Jr. |
| 6,057,903 A * | 5/2000 | Colgan et al. ................. 349/139 |
| 2007/0257890 A1* | 11/2007 | Hotelling et al. ............. 345/173 |

FOREIGN PATENT DOCUMENTS

| JP | SHO 56 500230 | 2/1981 |
| JP | 09-120334 | 5/1997 |
| JP | 2008-09750 | 1/2008 |

* cited by examiner

*Primary Examiner* — Alexander Eisen
*Assistant Examiner* — Kenneth B Lee, Jr.
(74) *Attorney, Agent, or Firm* — Robert J. Depke; The Chicago Technology Law Group, LLC

(57) ABSTRACT

A display includes: display pixel electrodes; common electrodes; a display layer; a display control circuit performing image display control based on an image signal; touch detection electrodes each arranged to form a capacitance between each of the touch detection electrodes and each of the common electrodes; and a touch detection circuit detecting an external proximity object based on a detection signal obtained from the touch detection electrodes with use of a common drive voltage for display applied to the common electrodes by the display control circuit as a touch sensor drive signal. The touch detection circuit includes: an A/D (analog-digital) converter section performing sampling of a detection signal obtained from each of the touch detection electrodes at three or more different sampling frequencies to produce three or more sampling detection signals, and a detection section performing a detection operation based on the three or more sampling detection signals.

15 Claims, 24 Drawing Sheets

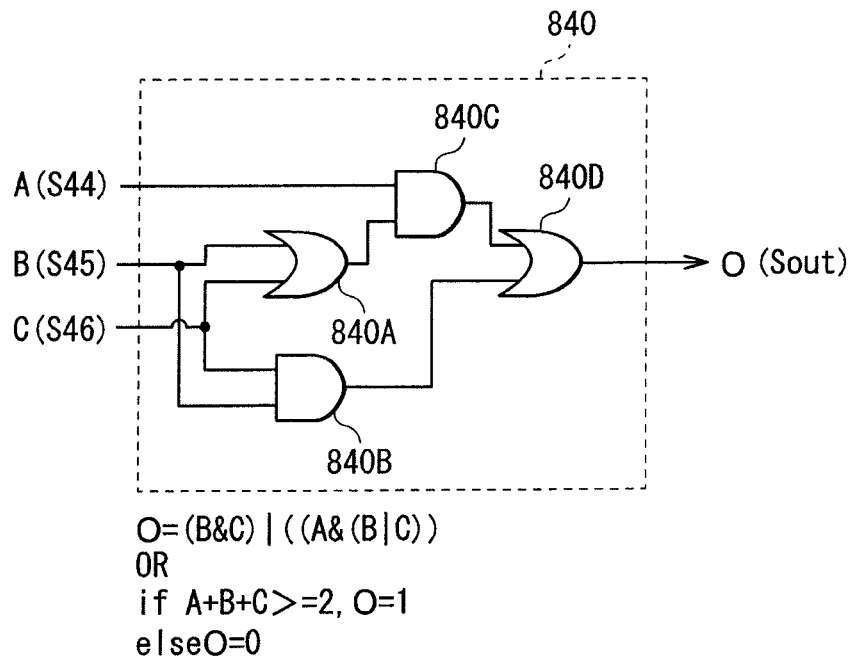
FIG. 10A
O=(B&C) | ((A&(B|C)))
OR
if A+B+C>=2, O=1
elseO=0
FIG. 10B
| A | B | C | O |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |
| 1 | 1 | 1 | 1 |
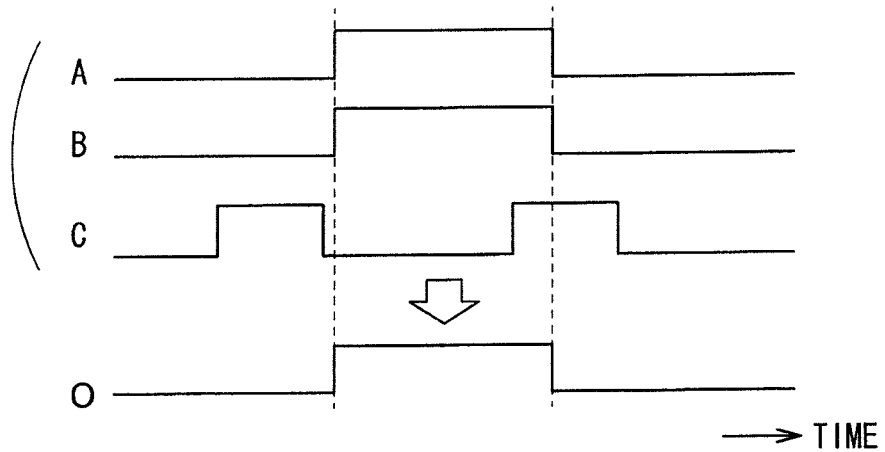
FIG. 10C

VOLTAGE APPLIED (WHITE)

NO VOLTAGE APPLIED (BLACK)

TOUCH SENSOR, DISPLAY AND ELECTRONIC UNIT

The present application claims priority to Japanese Patent Application JP 2009-154209 filed in the Japanese Patent Office on Jun. 29, 2009, the entire content of which is hereby incorporated by reference.

BACKGROUND OF THE INVENTION

1. Field of the Invention

The present invention relates to a display such as a liquid crystal display, specifically to a capacitive type touch sensor allowing information to be inputted thereinto by bringing a finger or the like of a user into contact with or close to the touch sensor, and a display and an electronic unit including such a touch sensor.

2. Description of the Related Art

In recent years, attention has been given to a display in which a contact detection device (hereinafter referred to as "touch sensor") so-called touch panel is directly mounted on a liquid crystal display and various buttons are displayed on the liquid crystal display so that information is allowed to be inputted by the buttons instead of normal buttons. This technique provides large advantages of space saving and a reduction in the number of components in a trend toward larger screen sizes of mobile devices, because a display and buttons are allowed to be located in a common area. However, in this technique, there is an issue that mounting of the touch sensor causes an increase in the whole thickness of a liquid crystal module. In particular, in the case where the touch sensor is applied to a mobile device, a protective layer for preventing scratches on the touch sensor is necessary, so liquid crystal modules have a tendency to have a larger thickness, and the tendency goes against a trend toward thinner liquid crystal modules.

Therefore, for example, as described in Japanese Unexamined Patent Application Publication No. 2008-9750 and U.S. Pat. No. 6,057,903, liquid crystal display elements with a touch sensor in which a capacitive type touch sensor is formed have been proposed so as to reduce the thickness of the liquid crystal display element. In this case, a conductive film for the touch sensor is arranged between an observation-side substrate of the liquid crystal display element and an observation-side polarizing plate arranged on an outer surface of the observation-side substrate, and the capacitive type touch sensor which has an outer surface of the polarizing plate as a touch surface is formed between the conductive film for the touch sensor and the outer surface of the polarizing plate. Moreover, a display with a built-in touch sensor has been proposed, for example, as described in Published Japanese Translation No. S56-500230 of PCT International Application.

SUMMARY OF THE INVENTION

However, in liquid crystal display elements with a touch sensor disclosed in Japanese Unexamined Patent Application Publication No. 2008-9750 and U.S. Pat. No. 6,057,903, in principle, it is necessary for a conductive film for the touch sensor to have the same potential as that of a user, and it is necessary for the user to be properly grounded. Therefore, aside from stationary televisions drawing power from an outlet, it is realistically difficult to apply the liquid crystal display elements with the touch sensor to mobile devices. Moreover, in the above-described technique, it is necessary for the conductive film for the touch sensor to come very close to a finger of the user, so a position where the conductive film for the touch sensor is arranged is limited, for example, the conductive film for the touch sensor is not allowed to be arranged deep in the liquid crystal display element. That is, the degree of flexibility in design is low. Moreover, in the above-described technique, because of the configuration, it is necessary to arrange a circuit section including a touch sensor drive section or a coordinate detection section separately from a display drive circuit section of the liquid crystal display element, so integration of circuits for a whole apparatus is difficult.

Therefore, it is considered that in addition to a common electrode originally arranged for application of a display drive voltage, a touch detection electrode forming a capacitance between the touch detection electrode and the common electrode is arranged in a display (a display with a capacitive type touch sensor with a novel configuration). It is because the capacitance changes depending on whether or not an object touches or comes close to the touch detection electrode, so when the display drive voltage to be applied to the common electrode by a display control circuit is also used (doubles) as a touch sensor drive signal, a detection signal in response to a change in capacitance is obtained from the touch detection electrode. Then, when the detection signal is inputted into a predetermined touch detection circuit, whether or not the object touches or comes close to the touch detection electrode is detectable. Moreover, by this technique, a display with a touch sensor which is applicable to a mobile device of which a user often has an unsteady potential is obtainable. Moreover, a display with a touch sensor having a high degree of flexibility in design according to the type of a display function layer is obtainable, and a circuit for display and a circuit for sensor are easily integrated into one circuit substrate, so there is an advantage of easy circuit integration.

In capacitive type touch sensors including the touch sensors in Japanese Unexamined Patent Application Publication No. 2008-9750, U.S. Pat. No. 6,057,903 and Published Japanese Translation No. S56-500230 of PCT international application and the touch sensor with the above-described novel configuration, it is desirable to remove (reduce) noise (external noise or disturbance noise) caused by external environments and stably detect an object (improve object detection accuracy) in consideration of the case where the touch sensors are used in different environments. It is because the external noise causes a change in an electric field from outside through a conductive detection object touching (or coming close to) the touch sensor, thereby to cause a malfunction in position detection. For example, in the case where a user touches a touch panel with his finger, the user acts as an antenna to pick up electromagnetic waves around the user, and then the electromagnetic waves are transmitted to a detection electrode to cause a detection error.

Therefore, for example, US Patent Application Publication No. 2007/0257890 discloses a capacitive type touch sensor having a technique for preventing an influence of the external noise by changing the frequency (drive frequency) of a detection drive signal in a state where the external noise is difficult to distinguish from a detection signal.

However, in this technique, a plurality of drive frequencies for detection are prepared in advance, and switching of the plurality of drive frequencies is performed depending on the state of the external noise, so there is an issue that a circuit configuration is complicated, because a plurality of drive frequencies are used.

Moreover, in the display with the capacitive type touch sensor having the above-described novel configuration, as described above, a display drive voltage applied to the common electrode is also used (doubles) as a touch sensor drive signal. Therefore, the signal frequency of the display drive voltage is usually fixed, so unlike the above-described technique, it is considered difficult to perform switching of a plurality of drive frequencies depending on the state of the external noise.

As described above, in the capacitive type touch sensors, it is difficult to stably detect an object with a simple configuration irrespective of external environments, so there is room for improvement.

It is desirable to provide a capacitive touch sensor allowed to stably detect an object with a simple configuration irrespective of external environments, and a display and an electronic unit including such a touch sensor.

According to an embodiment of the invention, there is provided a display including: a plurality of common electrodes arranged to face the display pixel electrodes; a display layer; a display control circuit performing image display control based on an image signal so as to activate the display layer by applying a voltage for display between the display pixel electrodes and the common electrodes; a plurality of touch detection electrodes facing the common electrodes or each arranged side by side with each of the common electrodes to form a capacitance between each of the touch detection electrodes and each of the common electrodes; and a touch detection circuit detecting an external proximity object based on a detection signal obtained from the touch detection electrodes with use of a common drive voltage for display applied to the common electrodes by the display control circuit as a touch sensor drive signal. Moreover, the touch detection circuit includes: an A/D (analog-digital) converter section performing sampling of a detection signal obtained from each of the touch detection electrodes at three or more different sampling frequencies to produce three or more sampling detection signals, and a detection section performing a detection operation based on the three or more sampling detection signals.

According to an embodiment of the invention, there is provided an electronic unit including the above-described display according to the embodiment of the invention.

In the display and the electronic unit according to the embodiment of the invention, a capacitance is formed between each of the common electrodes originally arranged for application of the display common voltage and each of the touch detection electrodes additionally arranged. The capacitance changes depending on whether an external proximity object touches or comes close to the touch detection electrode. Therefore, the display common voltage applied to the common electrodes by the display control circuit is also used (doubles) as a touch sensor drive signal, thereby a detection signal based on a change in capacitance is obtained from the touch detection electrode. Then, when the detection signal is inputted into the touch detection circuit, the external proximity object (whether or not the external proximity object touches or comes close to the touch detection electrode, or the like) is detected. In this case, in the touch detection circuit, sampling of the detection signal obtained from the touch detection electrode is performed at three or more different sampling frequencies to produce three or more sampling detection signals. Then, a detection operation is performed based on the three or more sampling detection signals. Thereby, even if folding noise of external noise is generated around a frequency region of the above-described detection signal, frequencies (folding frequencies) where the folding noise is generated in the sampling detection signals easily differ from one another. In other words, in the three or more sampling detection signals, a frequency of external noise where folding frequencies in a plurality of sampling detection signals are equal to one another is limited to a partial frequency region (for example, a partial frequency region on a higher frequency side than the detection signal). Therefore, the detection signal is easily distinguished (isolated) from the folding noise of the external noise, and unlike related art, a detection operation with less influence of external noise is allowed to be performed without changing a detection drive frequency (a frequency of a touch sensor drive signal).

According to an embodiment of the invention, there is provided a touch sensor including: a plurality of touch drive electrodes; a plurality of touch detection electrodes facing the touch drive electrodes or each arranged side by side with each of the touch drive electrodes to form a capacitance between each of the touch detection electrodes and each of the touch drive electrodes; and a touch detection circuit detecting an external proximity object based on a detection signal obtained from the touch detection electrodes by applying a touch sensor drive signal to the touch drive electrodes. Moreover, the touch detection circuit includes the above-described A/D converter section and the above-described detection section.

In the touch sensor according to the embodiment of the invention, a capacitance is formed between each of the touch drive electrodes and each of the touch detection electrodes. The capacitance changes depending on whether an external proximity object touches or comes close to the touch detection electrode. Therefore, when a touch sensor drive signal is applied to the touch drive electrode, a detection signal based on a change in capacitance is obtained from the touch detection electrode. Then, when the detection signal is inputted into the touch detection circuit, the external proximity object (whether or not the external proximity object touches or comes close to the touch detection electrode, or the like) is detected. In the touch detection circuit, by the same functions as those in the display and the electronic unit according to the above-described embodiment of the invention, the detection signal is easily distinguished (isolated) from the folding noise of the external noise, and unlike related art, a detection operation with less influence of external noise is allowed to be performed without changing the detection drive frequency (the frequency of the touch sensor drive signal).

In the touch sensor, the display and the electronic unit according to the embodiment of the invention, an external proximity object is detected based on a detection signal obtained from the touch detection electrode in response to a change in capacitance, and in detection, three or more sampling detection signals are produced by the sampling of the detection signal at three or more different sampling frequencies, and a detection operation is performed based on the three or more sampling detection signals, so the detection signal is easily distinguished (isolated) from the folding noise of the external noise, and a detection operation with less influence of external noise is allowed to be performed without changing the detection drive frequency. Therefore, stable object detection is allowed to be performed with a simple configuration irrespective of external environments.

Other and further objects, features and advantages of the invention will appear more fully from the following description.

BRIEF DESCRIPTION OF THE DRAWINGS

FIGS. 10A, 10B and 10C are illustrations of a specific configuration of a majority selection section illustrated in FIG. 9 and an example of operation of the majority selection section.

FIG. 23 is an external perspective view of Application Example 1 of the display according to the above-described respective embodiments and the like.

FIGS. 27A and 27B are a front view and a side view in a state in which Application Example 5 is opened, respectively, and FIGS. 27C to 27G are a front view, a left side view, a right side view, a top view and a bottom view in a state in which Application Example 5 is closed, respectively.

DETAILED DESCRIPTION OF THE PREFERRED EMBODIMENTS

Preferred embodiments will be described in detail below referring to the accompanying drawings. In addition, descriptions will be given in the following order.
1. Basic principle of touch detection system
2. First Embodiment (Example of a method of removing external noise with use of A/D conversion of a detection signal by three or more different sampling frequencies)
3. Second Embodiment (Example in which a transverse electric mode liquid crystal element is used as a display element)
4. Application Examples (Application examples of a display with a touch sensor to electronic units)
5. Other modifications Basic Principle of Touch Detection System First, referring to FIGS. 1 to 3, a basic principle of a touch detection system in a display with a touch sensor of the present invention will be described below. The touch detection system is embodied as a capacitive type touch sensor, and, for example, as illustrated in a part A in FIG. 1, the touch detection system has a configuration in which a capacitive element is configured of a pair of electrodes (a drive electrode E1 and a detection electrode E2) arranged to face each other with a dielectric D in between. This configuration is illustrated as an equivalent circuit illustrated in a part B in FIG. 1. A capacitive element C1 is configured of the drive electrode E1, the detection electrode E2 and the dielectric D. In the capacitive element C1, one end thereof is connected to an AC signal source (a drive signal source) S, and the other end P thereof is grounded through a resistor R and is connected to a voltage detector (a detection circuit) DET. When an AC rectangular wave Sg (refer to a part B in FIG. 3) with a predetermined frequency (for example, approximately a few kHz to ten-odd KHz) is applied from the AC signal source S to the drive electrode E1 (the one end of the capacitive element C1), an output waveform (a detection signal Vdet) as illustrated in a part A in FIG. 3 appears in the detection electrode E2 (the other end P of the capacitive element C1). In addition, the AC rectangular wave Sg corresponds to a common drive signal Vcom which will be described later.

Figure 1:
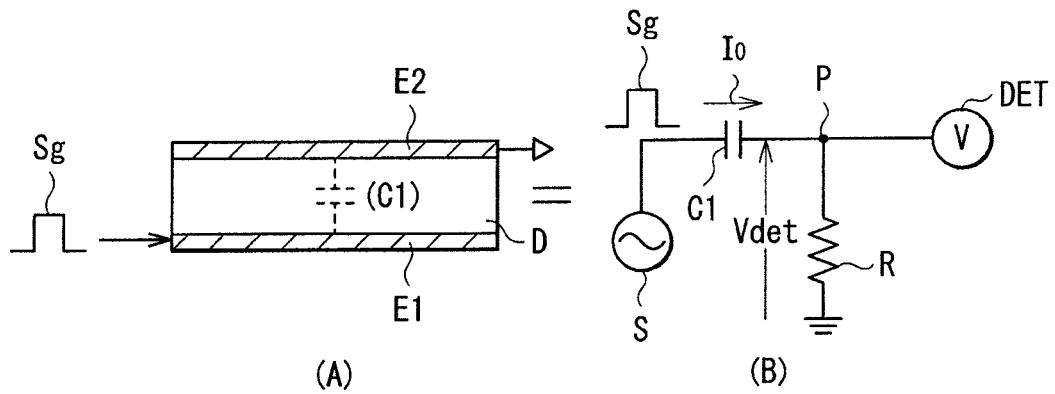
FIG. 1 is an illustration for describing an operation principle of a display with a touch sensor according to the invention which is not touched by a finger.

In a state where a finger does not touch (or come close to) the detection electrode E2, as illustrated in FIG. 1, a current I0 according to the capacity value of the capacitive element C1 flows during charging and discharging the capacitive element C1. A potential waveform at the other end P of the capacitive element C1 at this time is, for example, as illustrated by a waveform V0 in the part A in FIG. 3, and the waveform V0 is detected by the voltage detector DET.

Figure 2:
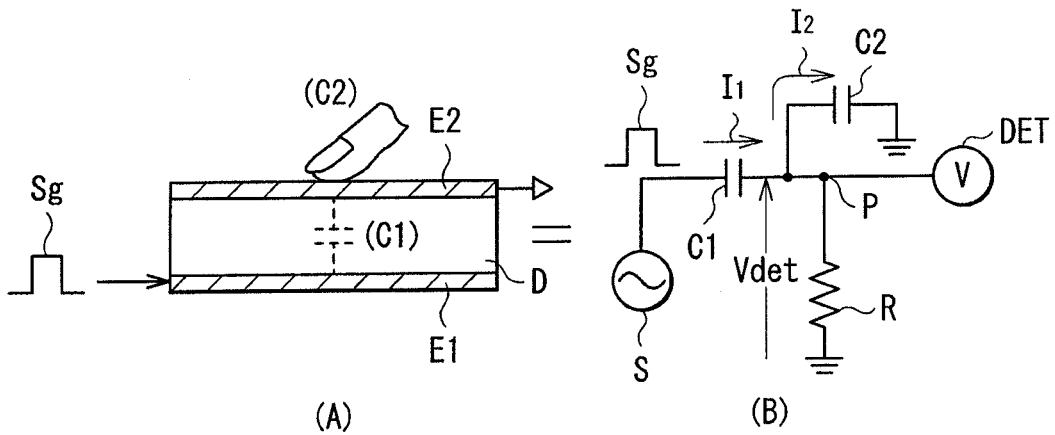
FIG. 2 is an illustration for describing the operation principle of the display with the touch sensor according to the invention which is touched by a finger.
Figure 3:
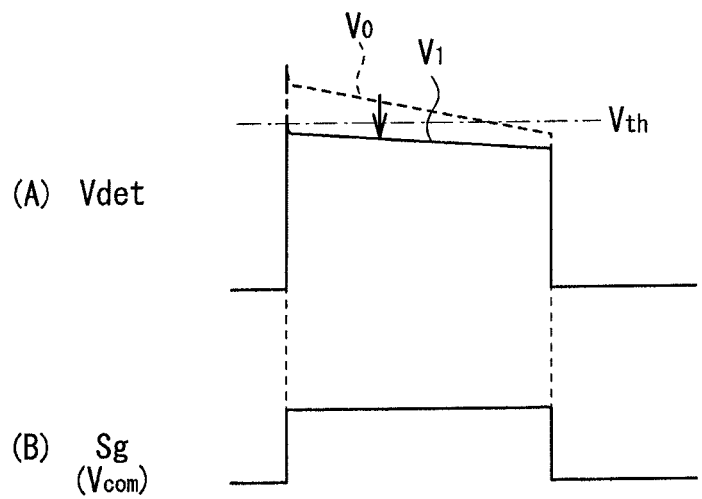
FIG. 3 is an illustration for describing the operation principle of the display with the touch sensor according to the invention, and illustrates an example of waveforms of a touch sensor drive signal and a detection signal.

On the other hand, in a state where the finger touches (or comes close to) the detection electrode E2, as illustrated in FIG. 2, a capacitive element C2 formed by the finger is added to the capacitive element C1 in series. In this state, currents I1 and I2 flow during charging and discharging the capacitive elements C1 and C2, respectively. The potential waveform at the other end P of the capacitive element C1 at this time is, for example, as illustrated by a waveform V1 in the part A in FIG. 3, and the waveform V1 is detected by the voltage detector DET. At this time, the potential at a point P is a divided potential determined by the values of the current I1 and I2 flowing through the capacitive elements C1 and C2, respectively. Therefore, the waveform V1 has a smaller value than that of the waveform V0 in a non-touch state. As will be described later, the voltage detector DET compares a detected voltage with a predetermined threshold voltage Vth, and when the detected voltage is equal to or higher than the threshold voltage Vth, the voltage detector DET determines that the state is in a non-touch state, and when the detected voltage is smaller than the threshold voltage, the voltage detector DET determines that the state is a touch state. Thus, touch detection is allowed.

First Embodiment

Configuration Example of Display 1

Figure 4:
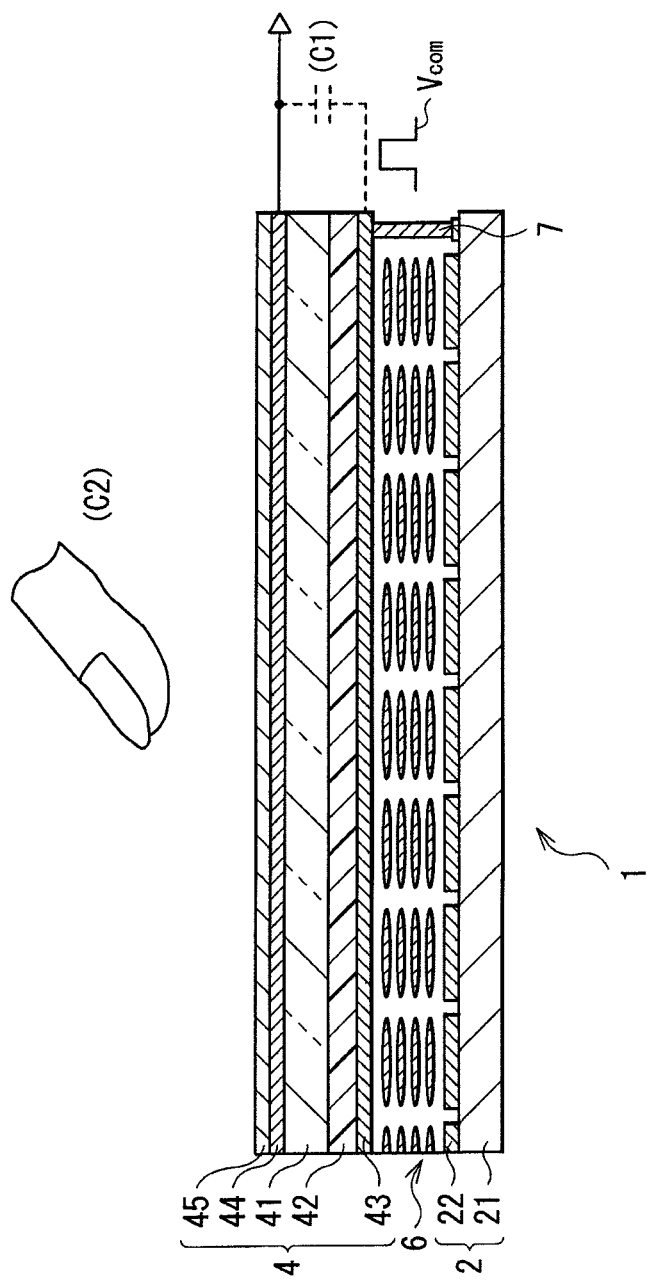
FIG. 4 is a schematic sectional view illustrating a display with a touch sensor according to a first embodiment of the invention.

FIG. 4 illustrates a sectional configuration of a main part of a display 1 with a touch sensor according to a first embodiment of the invention. The display 1 uses a liquid crystal display element as a display element and configures a capacitive type touch sensor by commonly using some (a common electrode 43 which will be described later) of electrodes and a display drive signal (the common drive signal Vcom which will be described later) which are originally included in the liquid crystal display element.

As illustrated in FIG. 4, the display 1 includes a pixel substrate 2, an opposed substrate 4 arranged to face the pixel substrate 2, and a liquid crystal layer 6 arranged between the pixel substrate 2 and the opposed substrate 4.

The pixel substrate 2 includes a TFT substrate 21 as a circuit substrate and a plurality of pixel electrodes 22 arranged in a matrix form on the TFT substrate 21. In the TFT substrate 21, in addition to a display driver and a TFT (thin film transistor) (both not illustrated) for driving each of the pixel electrodes 22, wirings such as a source line (a source line 25 which will be described later) for supplying an image signal to each of the pixel electrodes 22 and a gate line (a gate line 26 which will be described later) for driving each TFT are formed. A detection circuit (refer to FIG. 8) performing a touch detection operation which will be described later may be also formed in the TFT substrate 21.

The opposed substrate 4 includes a glass substrate 41, a color filter 42 formed on one surface of the glass substrate 41 and the common electrode 43 formed on the color filter 42. The color filter 42 is configured of, for example, color filter layers of three colors including red (R), green (G) and blue (B) which are periodically arranged, and a combination of the three colors R, G and B is allocated to each display pixel (each of the pixel electrodes 22). The common electrode 43 doubles as a sensor drive electrode configuring a part of the touch sensor performing a touch detection operation, and corresponds to the drive electrode E1 in FIG. 1.

The common electrode 43 is connected to the TFT substrate 21 through a contact conductive pillar 7. The common drive signal Vcom with an AC rectangular waveform is applied from the TFT substrate 21 to the common electrode 43 through the contact conductive pillar 7. The common drive signal Vcom determines a display voltage of each pixel with a pixel voltage applied to the pixel electrodes 22, and the common drive signal Vcom doubles as a touch sensor drive signal, and corresponds to an AC rectangular wave Sg supplied from the drive signal source S in FIG. 1. In other words, the polarity of the common drive signal Vcom is reversed at predetermined intervals. Moreover, the common drive signal Vcom is a rectangular wave (or a sawtooth wave) with a fixed frequency (for example, a fundamental frequency f0=a few kHz or over).

A sensor detection electrode (a touch detection electrode) 44 is formed on the other surface of the glass substrate 41, and a polarizing plate 45 is arranged on the sensor detection electrode 44. The sensor detection electrode 44 configures a part of the touch sensor, and corresponds to the detection electrode E2 in FIG. 1.

The liquid crystal layer 6 modulates light passing therethrough according to an electric field state, and uses, for example, a liquid crystal of any one of various modes such as TN (Twisted Nematic), VA (Vertical Alignment) and ECB (Electrically Controlled Birefringence).

In addition, alignment films are arranged between the liquid crystal layer 6 and the pixel substrates 2 and between the liquid crystal layer 6 and the opposed substrate 4, respectively. Moreover, an incident-side polarizing plate (not illustrated herein) is arranged on a lower surface of the pixel substrate 2.

Specific Configuration Example of Common Electrode 43 and Sensor Detection Electrode 44

Figure 5:
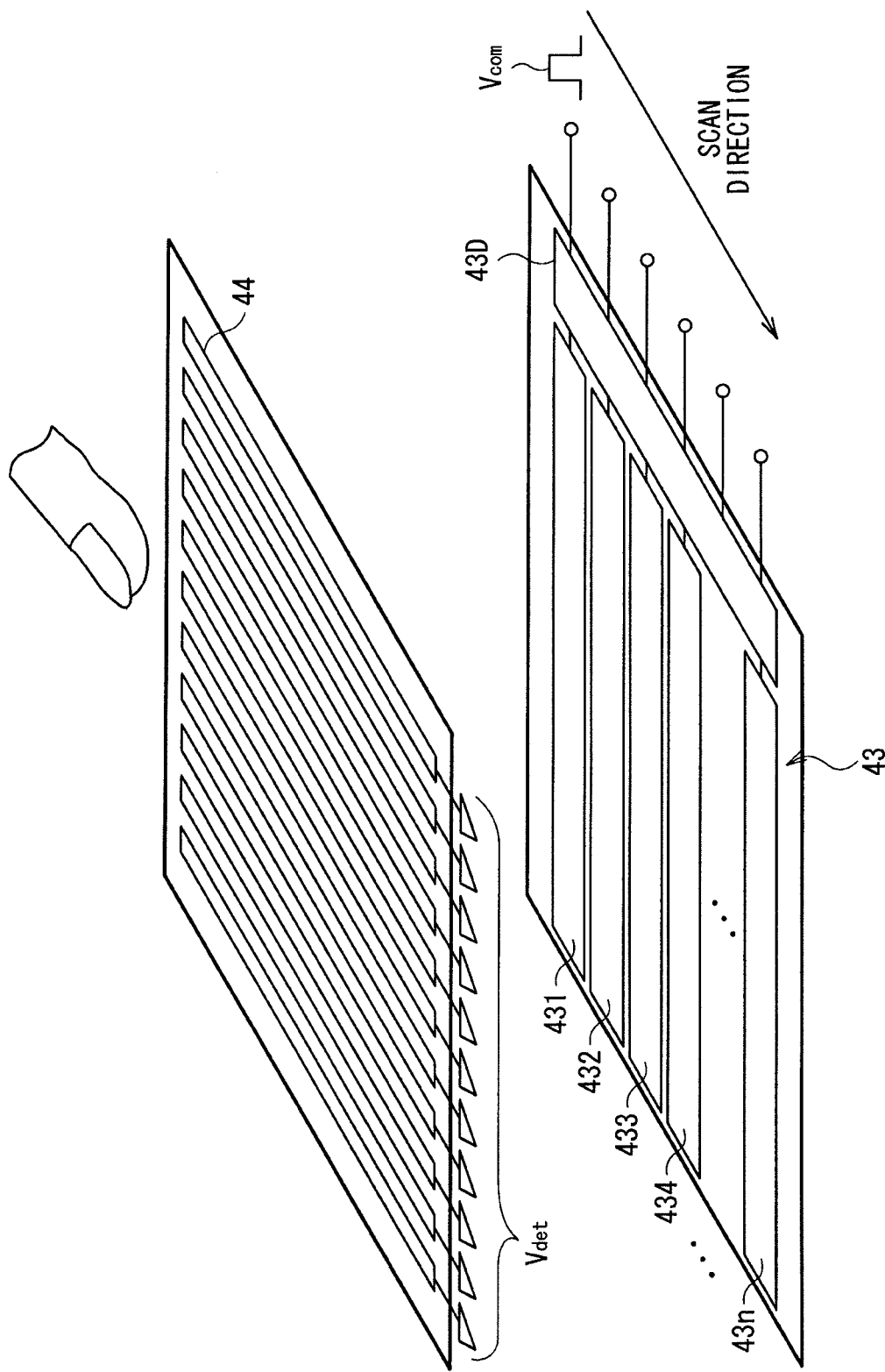
FIG. 5 is a perspective view illustrating a configuration example of a main part (a common electrode and a sensor detection electrode) of the display illustrated in FIG. 4.

FIG. 5 illustrates a perspective view of a configuration example of the common electrode 43 and the sensor detection electrode 44 in the opposed substrate 4. In the example, the common electrode 43 is divided into a plurality of strip-shaped electrode patterns (in this case, a number n (n is an integer of 2 or greater) of common electrodes 431 to 43n) extending in a lateral direction in the drawing. The common drive signal Vcom is sequentially supplied to the electrode patterns by a common electrode driver 43D so as to perform a line-sequential scanning drive in a time-divisional manner as will be described later. On the other hand, the sensor detection electrode 44 is configured of a plurality of strip-shaped electrode patterns extending in a direction orthogonal to a direction where the electrode patterns of the common electrode 43 extend. The detection signal Vdet is outputted from each of the electrode patterns of the sensor detection electrode 44 to be inputted into a detection circuit 8 illustrated in FIGS. 6 to 8 or the like.

Pixel Configuration and Configuration Example of Driver

Figure 6:
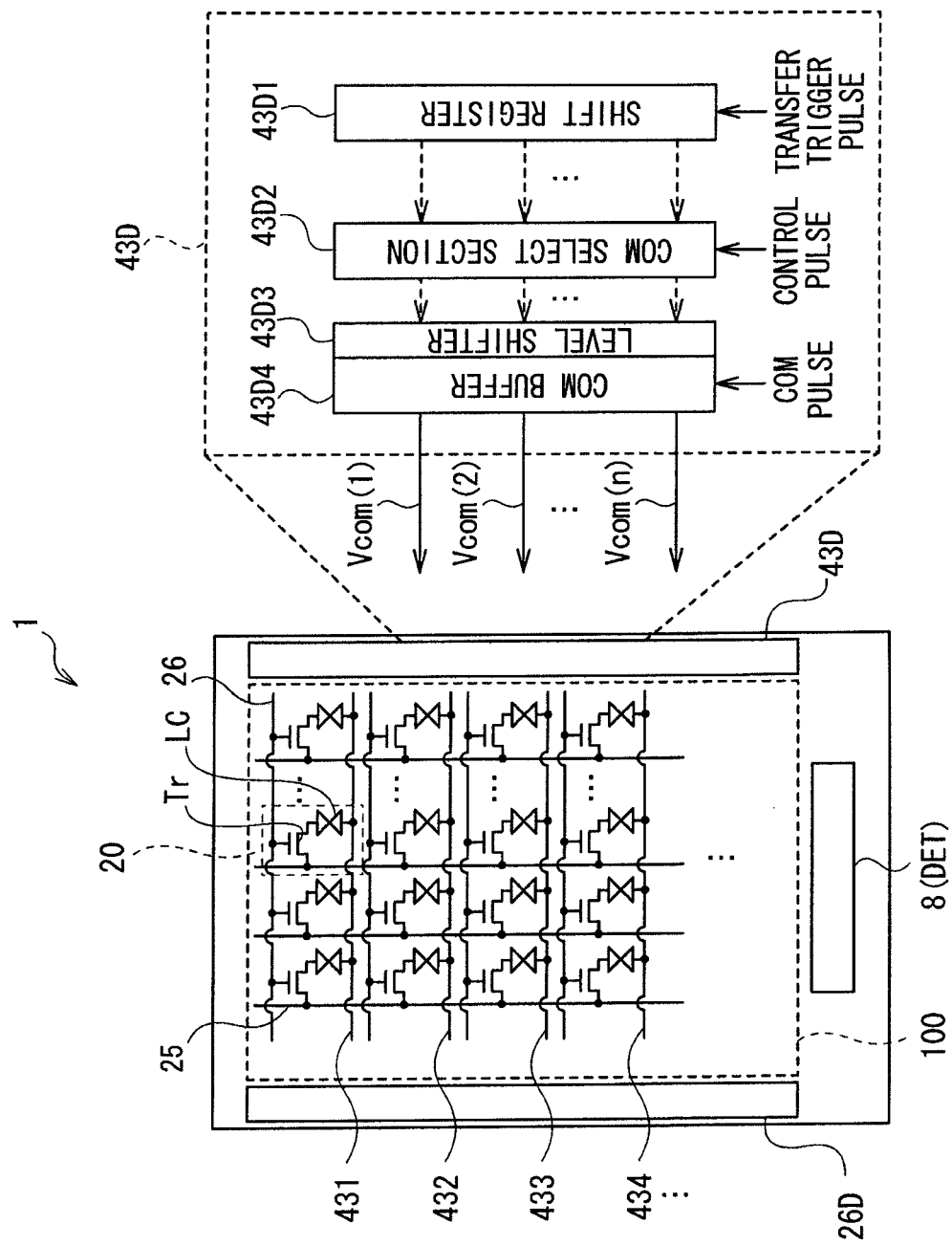
FIG. 6 is a block diagram illustrating an example of a pixel configuration and a specific configuration of a driver in the display illustrated in FIG. 4.
Figure 7:
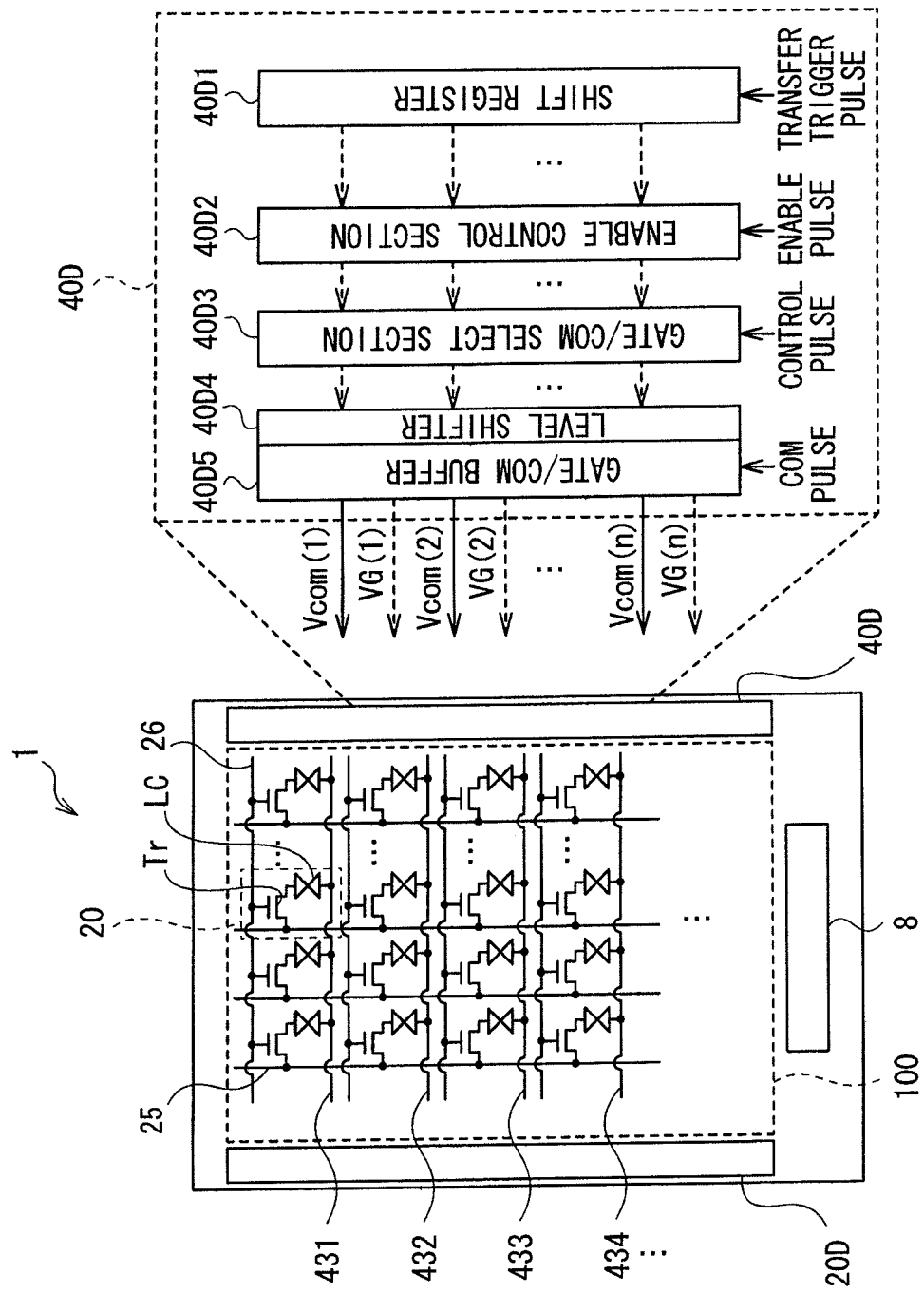
FIG. 7 is a block diagram illustrating another example of the pixel configuration and the specific configuration of the driver in the display illustrated in FIG. 4.

FIGS. 6 and 7 illustrate a pixel configuration and a configuration example of various drivers in the display 1. In the display 1, a plurality of pixels (display pixels 20) including TFT elements Tr and liquid crystal elements LC are arranged in a matrix form in an effective display area 100.

In an example illustrated in FIG. 6, gate lines 26 connected to a gate driver 26D, signal lines (source lines) 25 connected to a source driver (not illustrated), and common electrodes 431 to 43n connected to a common electrode driver 43D are connected to the display pixels 20. As described above, the common electrode driver 43D sequentially supplies the common drive signal Vcom (common drive signals Vcom(1) to Vcom(n)) to the common electrodes 431 to 43n. The common electrode driver 43D includes, for example, a shift register 43D1, a COM select section 43D2, a level shifter 43D3 and a COM buffer 43D4.

The shift register 43D1 is a logic circuit for sequentially transferring an input pulse. More specifically, when a transfer trigger pulse (a start pulse) is inputted into the shift register 43D1, a clock transfer starts. Moreover, in the case where the start pulse is inputted a plurality of times in one frame period, the transfer is allowed to be repeated accordingly. In addition, as the shift register 43D1, transfer logic circuits may be arranged independently of one another to control a plurality of common electrodes 431 to 43n, respectively. In this case, a control circuit size is increased, so as illustrated in FIG. 7 which will be described later, a transfer logic circuit is preferably shared between the gate driver and the common electrode driver, and a single transfer logic circuit is more preferably used irrespective of the number of the common electrodes 43.

The COM select section 43D2 is a logic circuit controlling whether or not to output the common drive signal Vcom to each display pixel 20 in the effective display area 100. In other words, the COM select section 43D2 controls output of the common drive signal Vcom according to a position or the like in the effective display area 100. Moreover, as will be described in detail later, when a control pulse inputted into the COM select section 43D2 is variable, the output position of the common drive signal Vcom is arbitrarily changeable in each horizontal line, or the output position is changeable after a lapse of a plurality of horizontal periods.

The level shifter 43D3 is a circuit for shifting a control signal supplied from the COM select section 43D2 to a potential level which is sufficient to control the common drive signal Vcom.

The COM buffer 43D4 is a final output logic circuit for sequentially supplying the common drive signal Vcom (the common drive signals Vcom(1) to Vcom(n)), and includes an output buffer circuit, a switch circuit or the like.

On the other hand, in an example illustrated in FIG. 7, the gate lines 26 and the common electrodes 431 to 43n connected to a gate-common electrode driver 40D and the signal lines (source lines) 25 connected to the source driver (not illustrated) are connected to the display pixels 20. The gate-common electrode driver 40D supplies a gate drive signal to each of the display pixels 20 through the gate lines 26, and sequentially supplies the common drive signal Vcom (the common drive signals Vcom(1) to Vcom(n)) to the common electrodes 431 to 43n. The gate-common electrode driver 40D includes, for example, a shift register 40D1, an enable control section 40D2, a gate/COM select section 40D3, a level shifter 40D4 and a gate/COM buffer 40D5.

The shift register 40D1 has the same functions as those of the above-described shift register 43D1, except that the gate driver and the common electrode driver share the use of the shift register 40D1.

The enable control section 40D2 produces a pulse for controlling the gate lines 26 by capturing an enable pulse with use of a clock pulse transferred from the shift register 40D1.

The gate/COM select section 40D3 is a logic circuit controlling whether or not to output the common drive signal Vcom and a gate signal VG to each of the display pixels 20 in the effective display area 100. In other words, the gate/COM select section 40D3 controls output of the common drive signal Vcom and output of the gate signal VG according to a position or the like in the effective display area 100.

The level shifter 40D4 is a circuit for shifting a control signal supplied from the gate/COM select section 40D3 to a potential level which is sufficient to control the gate signal VG and the common drive signal Vcom.

The gate/COM buffer 40D5 is a final output logic circuit for sequentially supplying the common drive signal Vcom (the common drive signals Vcom(1) to Vcom(n)) and the gate signal VG (gate signals VG(1) to VG(n)), and includes an output buffer circuit, a switch circuit or the like.

In addition, in the example illustrated in FIG. 7, in addition to these components, a T/G-DC/DC converter 20D is arranged in the display 1. The T/G-DC/DC converter 20D functions as a T/G (timing generator) and a DC/DC converter.

Circuit Configuration Example of drive Signal Source S and Detection Circuit 8

Figure 8:
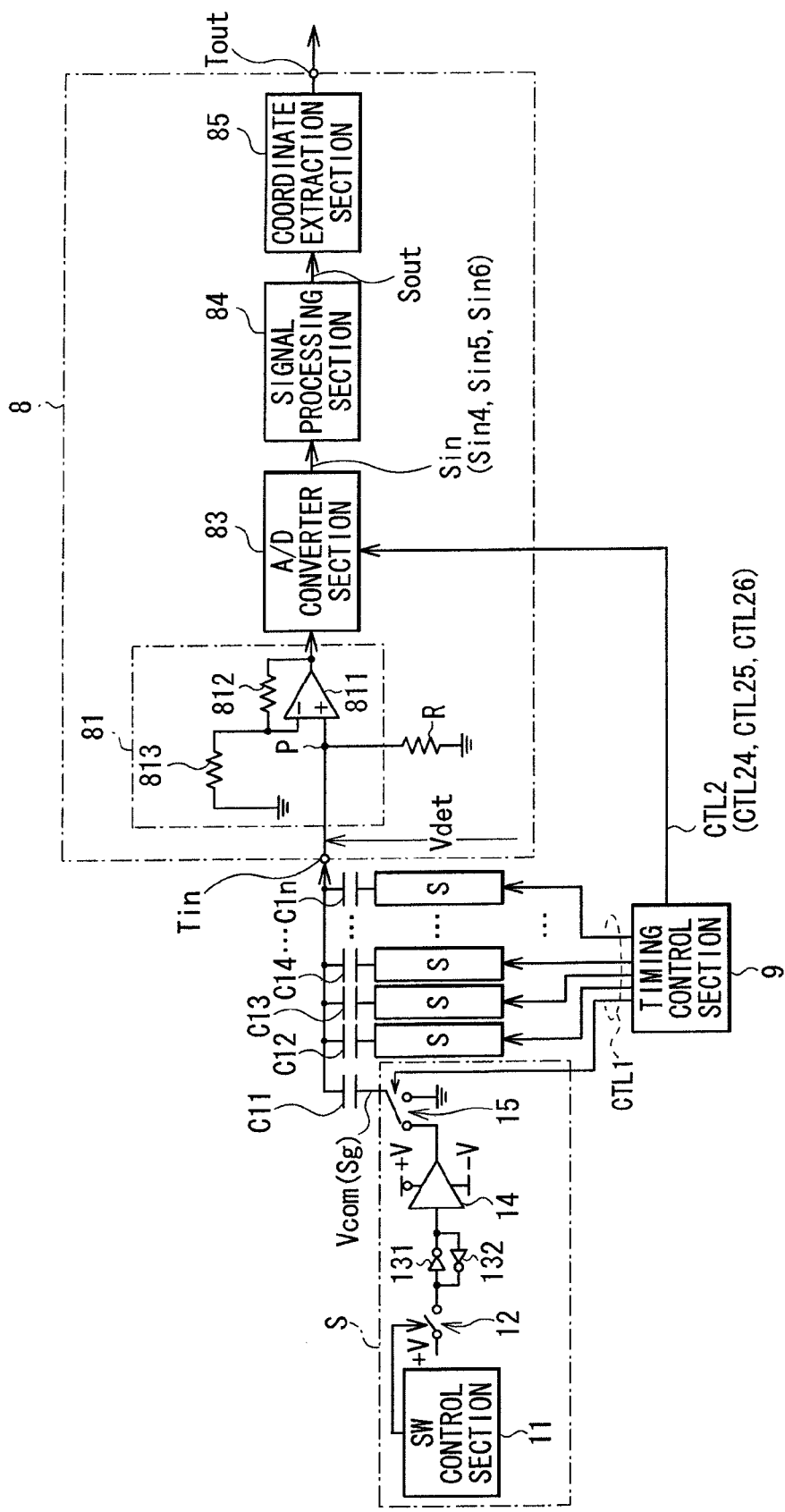
FIG. 8 is a circuit diagram illustrating a configuration example of a detection circuit and the like in the display illustrated in FIG. 4.

FIG. 8 illustrates a circuit configuration example of the drive signal source S illustrated in FIG. 1 and the detection circuit 8 performing a touch detection operation together with the timing control section 9 as a timing generator. In the drawing, capacitive elements C11 to C1n correspond to (electrostatic) capacitive elements formed between the common electrodes 431 to 43n and the sensor detection electrode 44 illustrated in FIG. 5, respectively.

One drive signal source S is arranged for each of the capacitive elements C11 to C1n. The drive signal source S includes an SW control section 11, two switch elements 12 and 15, two inverter (logical NOT) circuits 131 and 132 and an operational amplifier 14. The SW control section 11 controls ON/OFF states of the switch element 12, thereby a connection state between a power source +V and the inverter circuits 131 and 132 is controlled. An input terminal of the inverter circuit 131 is connected to one end (a terminal on a side opposite to a side facing the power source +V) of the switch element 12 and an output terminal of the inverter circuit 132. An output terminal of the inverter circuit 131 is connected to an input terminal of the inverter circuit 132 and an input terminal of the operational amplifier 14. Thereby, these inverter circuits 131 and 132 function as oscillation circuits outputting a predetermined pulse signal. The operational amplifier 14 is connected to two power sources +V and −V. The ON/OFF states of the switch element 15 are controlled in response to a timing control signal CTL1 supplied from the timing control section 9. More specifically, by the switch element 15, one end (on a side facing the common electrodes 431 to 43n) of each of the capacitive elements C11 to C1n is connected to an output terminal (on a side facing a supply source of the common drive signal Vcom) of the operational amplifier 14 or a ground. Thereby, the common drive signal Vcom is supplied from each of drive signal sources S to each of the capacitive elements C11 to C1n.

The detection circuit 8 (the voltage detector DET) includes an amplification section 81, an A/D (analog/digital) converter section 83, a signal processing section 84, a frame memory 86, a coordinate extraction section 85 and the above-described resistor R. In addition, an input terminal Tin of the detection circuit 8 is commonly connected to the other end (on a side facing the sensor detection electrode 44) of each of the capacitive elements C11 to C1n.

The amplification section 81 is a section amplifying the detection signal Vdet inputted from the input terminal Tin, and includes an operational amplifier 811 for signal amplification and two resistors 812 and 813. A positive input end (+) of the operational amplifier 811 is connected to the input terminal Tin, and an output end of the operational amplifier 811 is connected to an input end of the A/D converter section 83 which will be described later. One end of the resistor 812 and one end of the resistor 813 are connected to a negative input end (−) of the operational amplifier 811, and the other end of the resistor 812 is connected to an output end of the operational amplifier 811, and the other end of the resistor 813 is connected to a ground. Thereby, the amplification section 81 functions as a noninverting amplifier circuit.

The resistor R is arranged between a connection point P on the positive input end (+) side of the operational amplifier 811 and a ground. The resistor R prevents the sensor detection electrode 44 from being floating so as to keep a stable state.

Thereby, there are advantages that in the detection circuit 8, the signal value of the detection signal Vdet is prevented from being unstable and fluctuating, and static electricity is allowed to be discharged to a ground through the resistor R.

The A/D converter section 83 performs sampling of the analog detection signal Vdet amplified by the amplification section 81 at a predetermined timing (a sampling timing ts) to supply a detection signal Sin (a sampling detection signal) obtained by the sampling to the signal processing section 84. More specifically, as will be described in detail later, the detection signal Vdet is sampled at three or more (in this case, three) different sampling frequencies fs to produce three or more (in this case, three) sampling detection signals Sin4, Sin5 and Sin6. Moreover, the sampling timing ts (a sampling frequency fs) in the A/D converter section 83 is controlled by a timing control signal CTL2 (CTL24, CTL25, CTL26) supplied from the timing control section 9. In addition, the sampling timing ts will be described in detail later (refer to FIGS. 13, 15 and 16).

The signal processing section 84 performs a predetermined signal process (for example, a signal process such as a process of digitally removing noise or a process of converting frequency information into position information) on the detection signals Sin (Sin4, Sin5 and Sin6) which are obtained by the sampling and outputted from the A/D converter section 83. The signal processing section 84 also performs a predetermined operation process for removing (reducing) noise on each of the detection signals Sin4, Sin5 and Sin6 with use of a fact that frequencies (folding frequencies fi) where folding noise (of the following external noise) is generated in the detection signals Sin4, Sin5 and Sin6 easily differ from one another. In this case, such noise is broadly divided into two kinds, that is, noise (internal noise) caused by an image signal writing operation and noise (external noise) caused by external environments. In addition, the configuration of the signal processing section 84 will be described in detail later (refer to FIGS. 9, 10A, 10B and 10C).

The coordinate extraction section 85 determines an object detection result based on the detection signal (a detection signal Sout obtained by removing (reducing) the above-described internal noise or external noise) outputted from the signal processing section 84 to output the object detection result to an output terminal Tout. The object detection result includes a result of whether or not the sensor detection electrode 44 is touched by an object, and, in the case where the sensor detection electrode 44 is touched by the object, position coordinates of a touched position.

In addition, such a detection circuit 8 may be formed in a perimeter region (a non-display region or a frame region) on the opposed substrate 4, or a perimeter region on the pixel substrate 2. However, in terms of simplification by circuit integration, the detection circuit 8 is more preferably formed on the pixel substrate 2, because the detection circuit 8 is integrated with various circuit elements for display control which are formed on the pixel substrate 2. In this case, each electrode pattern of the sensor detection electrode 44 and the detection circuit 8 of the pixel substrate 2 may be connected to each other through a contact conductive pillar (not illustrated) similar to the contact conductive pillar 7 so as to transmit the detection signal Vdet from the sensor detection electrode 44 to the detection circuit 8.

Specific Configuration Examples of A/D Converter Section 83 and Signal Processing Section 84

Figure 9:
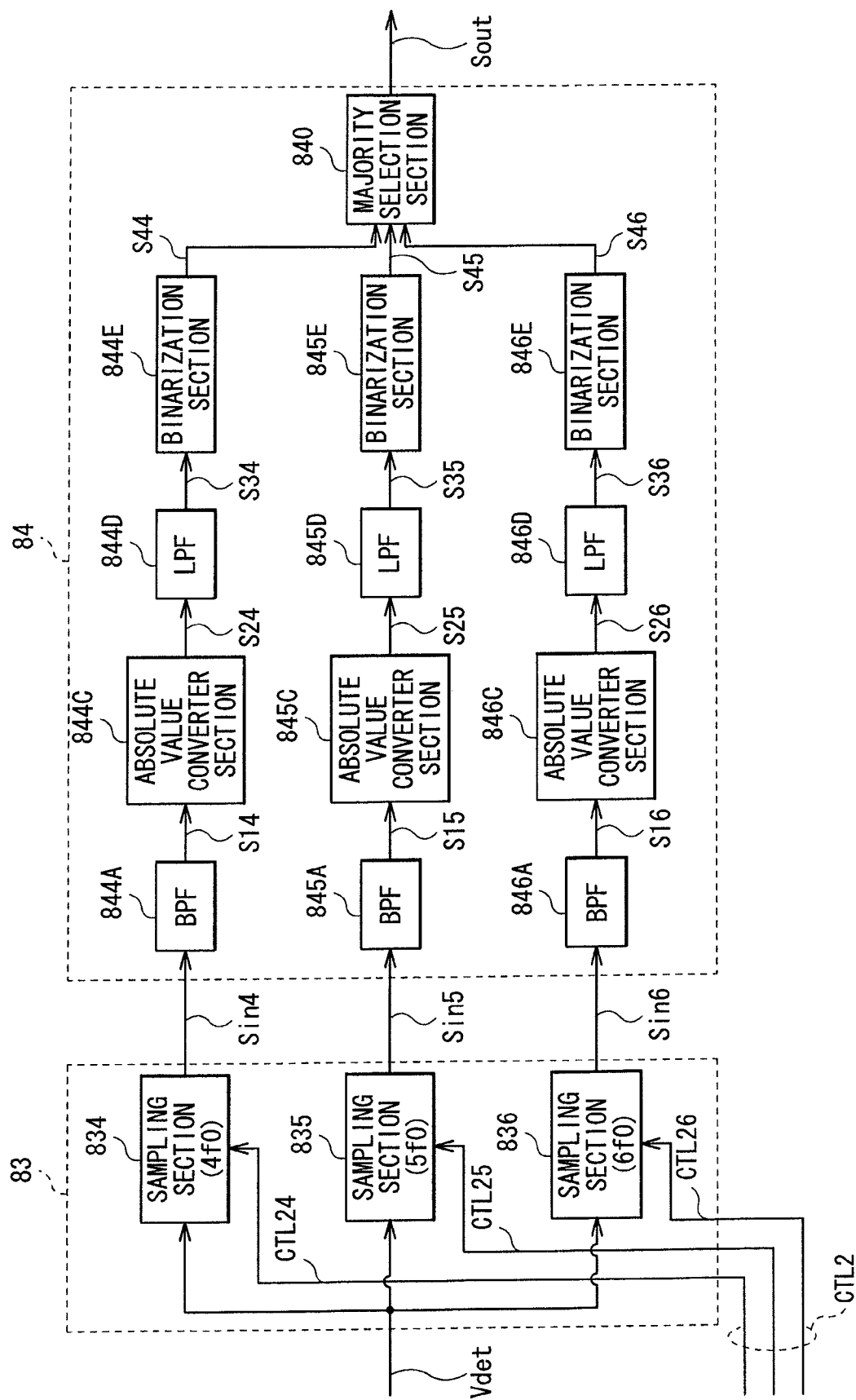
FIG. 9 is a block diagram illustrating specific configuration examples of an A/D converter section and a signal processing section illustrated in FIG. 8.

FIG. 9 illustrates a block diagram of specific configurations of the A/D converter section 83 and the signal processing section 84 illustrated in FIG. 8. The A/D converter section 83 includes three sampling sections 834, 835 and 836. The signal processing section 84 includes three band-pass filters (BPFs) 844A, 845A and 846A and three absolute value converter sections 844C, 845C and 846C. The signal processing section 84 further includes three low-pass filters (LPFs) 844D, 845D and 846D, three binarization sections 844E, 845E and 846E and one majority selection section 840.

The sampling section 834 samples the detection signal Vdet supplied from the amplification section 81 in response to control by the timing control signal CTL24 at a predetermined sampling timing ts to supply the detection signal Sin4 obtained by sampling to the signal processing section 84. Likewise, the sampling section 835 samples the detection signal Vdet in response to control by the timing control signal CTL25 at a predetermined sampling timing ts' to supply the detection signal Sin5 obtained by sampling to the signal processing section 84. Moreover, the sampling section 836 samples the detection signal Vdet in response to control by the timing control signal CTL25 at a predetermined timing ts" to supply the detection signal Sin6 obtained by sampling to the signal processing section 84.

In this case, in the embodiment, in these three sampling sections 834, 835 and 836, sampling of the detection signal Vdet is performed at different sampling timings ts, ts' and ts" (the sampling frequencies fs). More specifically, the sampling section 834 uses, as the sampling frequency fs, a frequency (4f0) same as a frequency of four times as high as the fundamental frequency f0 of the common drive signal Vcom. The sampling section 835 uses, as the sampling frequency fs, a frequency (5f0) same as a frequency of five times as high as the fundamental frequency f0, and the sampling section 836 uses, as the sampling frequency fs, a frequency (6f0) same as a frequency of six times as high as the fundamental frequency f0. In other words, in this case, in each of the sampling sections 834, 835 and 836, as the sampling frequency fs, a frequency (N×f0) same as a frequency of N (N is an integer of 2 or greater) times as high as the fundamental frequency f0 is used. However, each sampling frequency fs is not limited to a frequency same as a frequency of an integer times as high as the fundamental frequency f0. For example, in the case where an influence of display noise (internal noise which will be described later) is small, or the like, the sampling frequency fs is not necessarily a frequency same as a frequency of an integer times as high as the fundamental frequency f0.

The BPF 844A is a filter selectively allowing a signal (a detection signal S14), contained in the detection signal Sin4 which is obtained by sampling and supplied from the sampling section 834 and having a frequency same as the fundamental frequency f0 of the above-described common drive signal Vcom, to pass therethrough. Likewise, the BPF 845A selectively allowing a signal (a detection signal S15), contained in the detection signal Sin5 which is obtained by sampling and supplied from the sampling section 835 and having a frequency same as the fundamental frequency f0, to pass therethrough. Moreover, the BPF 846A selectively allowing a signal (a detection signal S16), contained in the detection signal Sin6 which is obtained by sampling and supplied from the sampling section 836 and having a frequency same as the fundamental frequency f0, to pass therethrough. In addition, the BPFs 844A, 845A and 846A correspond to specific examples of "a filter section" in the invention.

The absolute value converter sections 844C, 845C and 846C perform absolute value conversion with respect to a voltage value of 0 (zero) (a process of inverting negative portions of a signal waveform with respect to 0 V as a center) on the detection signals S14, S15 and S16 having passed through the BPFs 844A, 845A and 846A, respectively.

The LPFs 844D, 845D and 846D perform a predetermined LPF process on detection signals S24, S25 and S26 which are obtained by the absolution value conversion and outputted from the absolute value converter sections 844C, 845C and 846C to produce detection signals S34, S35 and S36, respectively. More specifically, the LPFs 844D, 845D and 846D are LPFs selectively allowing only a frequency of a signal corresponding to an object to be detected to pass therethrough (extracting only the frequency of the signal). In addition, instead of such LPFs, BPFs or envelope detector circuits may be used.

The binarization sections 844E, 845E and 846E perform a binarization process on the detection signals S34, S35 and S36 having passed through the LPFs 844D, 845D and 846D, respectively, by comparing the detection signals S34, S35 and S36 with a predetermined threshold value so as to produce detection signals S44, S45 and S46, respectively.

The majority selection section 840 performs a predetermined majority rule operation with use of the detection signals S44, S45 and S46 outputted from the binarization sections 844E, 845E and 846E, respectively, to output the final detection signal Sout used for object detection to the coordinate extraction section 85. More specifically, a detection signal decided by majority in the three detection signals S44, S45 and S46 (in this case, two or more of the detection signals S44, S45 and S46 have the same value) is used and outputted as the detection signal Sout. In this case, the majority selection section 840 and the above-described coordinate extraction section 85 correspond to specific examples of "a detection section" in the invention.

FIGS. 10A, 10B and 10C illustrate a specific configuration and an operation of the majority selection section 840, and FIGS. 10A, 10B and 10C illustrate a configuration of a logic circuit of the majority selection section 840, a truth table in the logic circuit, and a waveform chart indicating an operation result in the logic circuit, respectively. In addition, in the drawings, the detection signals S44, S45 and S46 as input signals are signals A, B and C, respectively, and the detection signal Sout as an output signal are a signal O.

As illustrated in FIG. 10A, the majority selection section 840 includes two OR (logical OR) circuits 840A and 840D and two AND (logical AND) circuits 840B and 840C. The signals B and C are inputted into two terminals, respectively, of each of the OR circuit 840A and the AND circuit 840B. The signal A and an output signal from the OR circuit 840A are inputted into two input terminals, respectively, of the AND circuit 840C. An output signal from the AND circuit 840B and an output signal from the AND circuit 840C are inputted into two input terminals, respectively, of the OR circuit 840D. Then, an output signal from the OR circuit 840D is the signal O (the detection signal Sout). Thus, it is obvious from FIGS. 10B and 10C that in both of the case where a logical "1" is decided by majority and the case where a logical "0" is decided by majority, the same circuit configuration is used so that a circuit is easily configured.

Functions and Effects of Display 1

Next, functions and effects of the display 1 according to the embodiment will be described below.

1. Basic Operation

In the display 1, a display driver (such as the common electrode driver 43D) of the pixel substrate 2 line-sequentially supplies the common drive signal Vcom to the electrode patterns (the common electrodes 431 to 43n) of the common electrode 43. The display driver also supplies a pixel signal (an image signal) to the pixel electrodes 22 through the source lines 25, and line-sequentially controls switching of TFTs (TFT elements Tr) of pixel electrodes 22 through the gate lines 26 in synchronization with the supply of the pixel signal. Thereby, an electric field in a longitudinal direction (a direction perpendicular to a substrate) determined by the common drive signal Vcom and each image signal is applied to the liquid crystal layer 6 in each display pixel 20 to modulate a liquid crystal state. Thus, display by a so-called reverse drive is performed.

On the other hand, in the opposed substrate 4, the capacitive elements C1 (the capacitive elements C11 to C1n) are formed at intersections of the electrode patterns of the common electrode 43 and the electrode patterns of the sensor detection electrode 44, respectively. In this case, for example, as illustrated by an arrow (a scan direction) in FIG. 5, when the common drive signal Vcom is sequentially applied to the electrode patterns of the common electrode 43 in a time-divisional manner, the capacitive elements C11 to C1n in one line formed at intersections of the electrode patterns to which the common drive signal Vcom is applied of the common electrode 43 and the electrode patterns of the sensor detection electrode 44 are charged and discharged. As a result, the detection signal Vdet with a magnitude according to the capacity value of the capacitive element C1 is outputted from each of the electrode patterns of the sensor detection electrode 44. In a state where a finger of a user does not touch a surface of the opposed substrate 4, the magnitude of the detection signal Vdet is substantially constant. The line of the capacitive elements C1 subjected to charge and discharge is line-sequentially moved according to scanning by the common drive signal Vcom.

Figure 11:
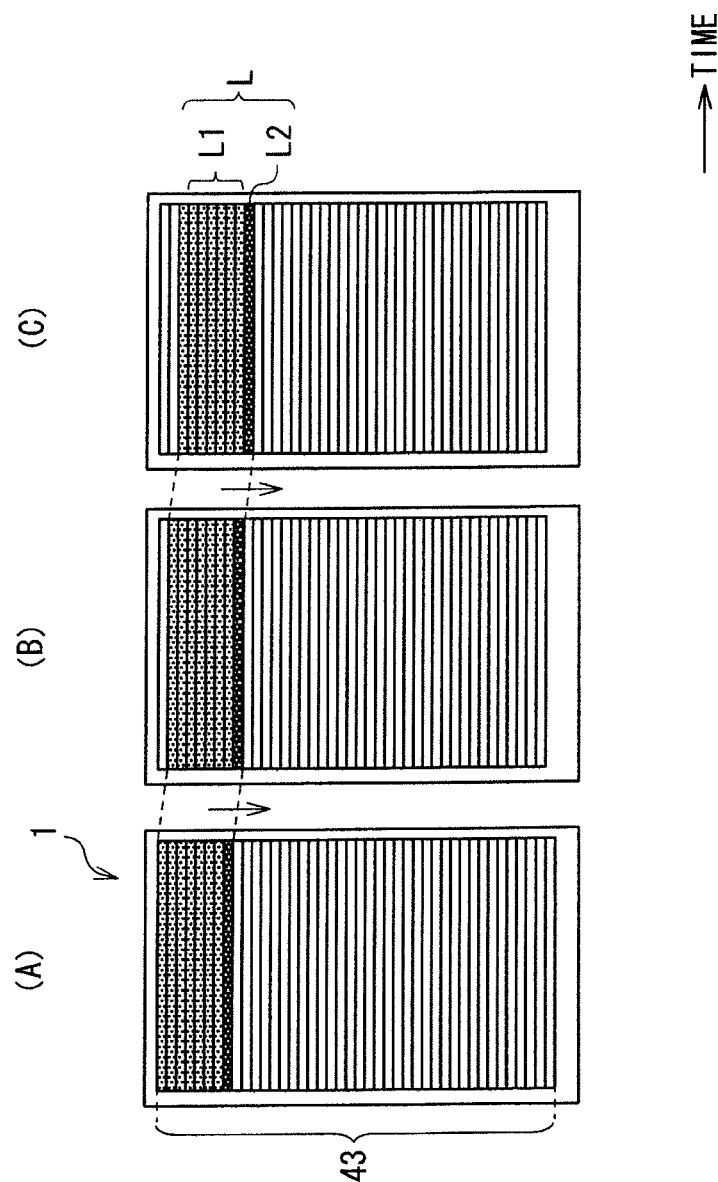
FIG. 11 is a schematic view illustrating an example of a line-sequential operation drive of a common electrode.

In addition, in the case where the electrode patterns of the common electrode 43 are line-sequentially driven in such a manner, for example, as illustrated in parts A, B and C in FIG. 11, a line-sequential drive operation is preferably performed collectively on some of the electrode patterns of the common electrode 43. More specifically, a drive line L configured of some of the electrode patterns includes a detection drive line L1 configured of a plurality of electrode patterns and a display drive line L2 configured of one or more (in this case, one) electrode patterns. Thereby, degradation in image quality due to scratches or speckles corresponding to the shapes of the electrode patterns of the common electrode 43 is preventable.

In this case, when the finger of the user touches a position of the surface of the opposed substrate 4, the capacitive element C2 by the finger is added to the capacitive element C1 which is originally formed in the touched position. As a result, the value of the detection signal Vdet when the touched position is scanned (that is, when the common drive signal Vcom is applied to an electrode pattern corresponding to the touched position in the electrode patterns of the common electrode 43) is smaller than that when other positions are scanned. The detection circuit 8 (refer to FIG. 8) compares the detection signal Vdet with the threshold voltage Vth, and in the case where the detection signal Vdet is smaller than the threshold voltage Vth, the detection circuit 8 determines the position as the touched position. The touched position is allowed to be determined based on a timing of applying the common drive signal Vcom and a timing of detecting the detection signal Vdet which is smaller than the threshold voltage Vth.

Thus, in the display 1 with the touch sensor according to the embodiment, the common electrode 43 originally included in the liquid crystal display element doubles as one of a pair of touch sensor electrodes configured of a drive electrode and a detection electrode. Moreover, the common drive signal Vcom as a display drive signal doubles as a touch sensor drive signal. Thereby, in the capacitive type touch sensor, only the sensor detection electrode 44 is additionally arranged, and it is not necessary to additionally prepare a touch sensor drive signal. Therefore, the configuration of the display 1 with the touch sensor is simple. Moreover, the number of components is reduced, and the thickness of the display 1 is reduced, so the display 1 is allowed to be mounted in a thin electronic unit.

Moreover, in a display with a touch sensor in related art (refer to Japanese Unexamined Patent Application Publication No. 2008-9750), the magnitude of a current flowing through the sensor is accurately measured, and a touched position is determined based on the measured value by an analog operation. On the other hand, in the display 1 according to the embodiment, it is only necessary to digitally detect the presence or absence of a relative change in current (a potential change) depending on whether or not the sensor detection electrode 44 is touched, so detection accuracy is allowed to be improved with a simple detection circuit configuration. Moreover, a capacitance is formed between the common electrode 43 originally arranged for application of the common drive signal Vcom and the sensor detection electrode 44 additionally arranged, and touch detection is performed using a change in the capacitance with the touch of the finger of the user. Therefore, the display 1 is applicable to a mobile device of which a user often has an unsteady potential.

Further, the sensor detection electrode 44 is divided into a plurality of electrode patterns, and the electrode patterns are individually driven in a time-divisional manner, so a touched position is detectable.

2. Function of Characteristic Part; detection Operation Using a Noise Removal Process Next, referring to FIGS. 12 to 16, a detection operation using a noise removal process as one of characteristic parts of the invention will be described in detail below.

Figure 12:
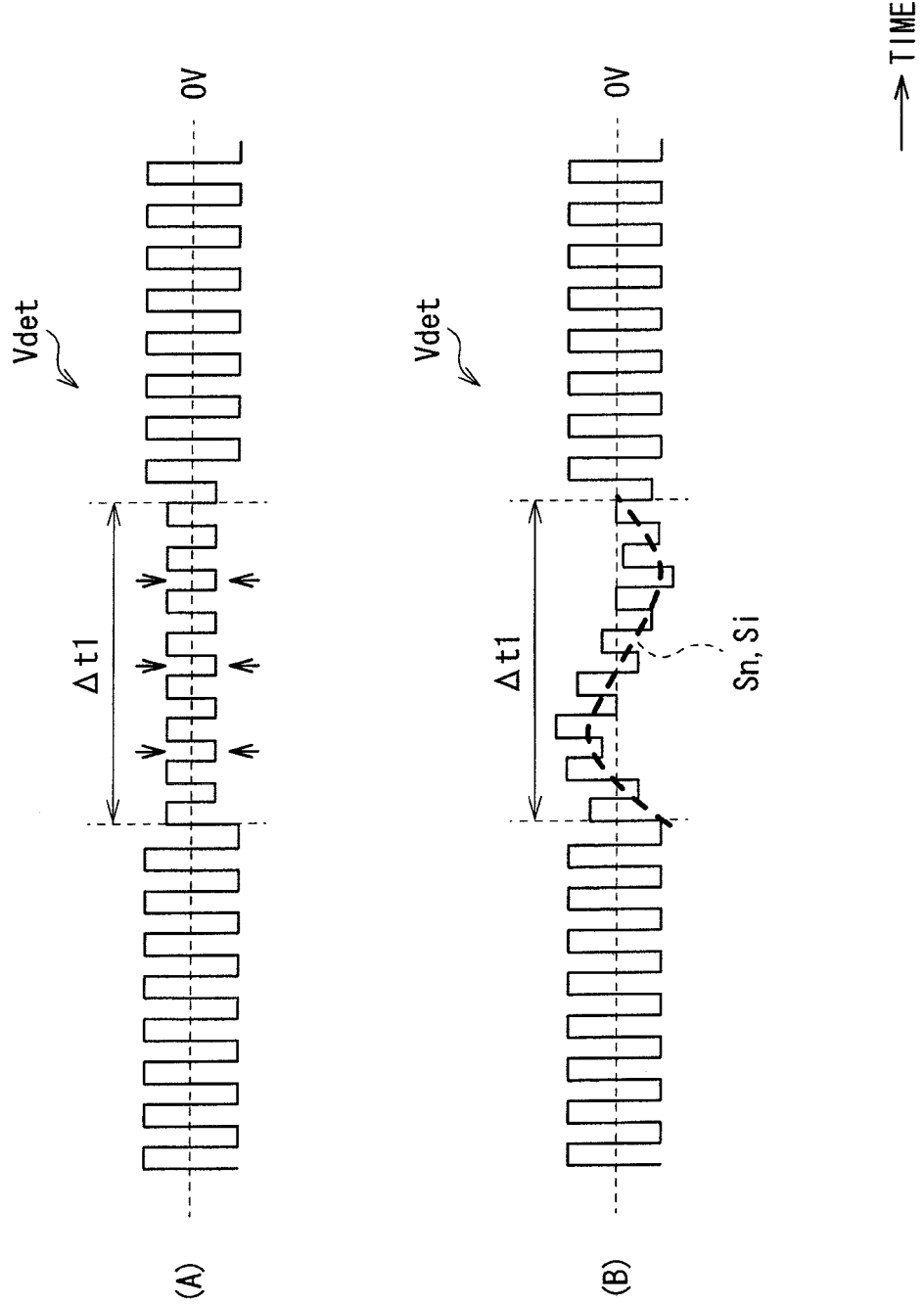
FIG. 12 is a timing waveform chart for describing disturbance noise (external noise) in a detection operation in a display.

First, for example, as illustrated in a part A in FIG. 12, in a range (a detection period Δt1) touched by a finger of a user, as described above, the value of the detection signal Vdet is smaller than that in other positions by capacity coupling of the originally formed capacitive element C1 and the capacitive element C2 formed by the finger. On the other hand, for example, external noise (disturbance noise) Sn or folding noise Si thereof caused by external environments such as light from an inverter fluorescent lamp is applied to the sensor detection electrode 44 through the finger, for example, the detection signal Vdet is changed as illustrated in a part B in FIG. 12. In other words, in the detection period Δt1, the waveform of external noise Sn or folding noise Si thereof is superimposed on the waveform of the detection signal Vdet illustrated in the part A in FIG. 12. In they case where the detection signal Vdet with a waveform on which such external noise Sn or folding noise Si thereof is superimposed is used, in this state, it is difficult to detect an object immediately.

Figure 13:
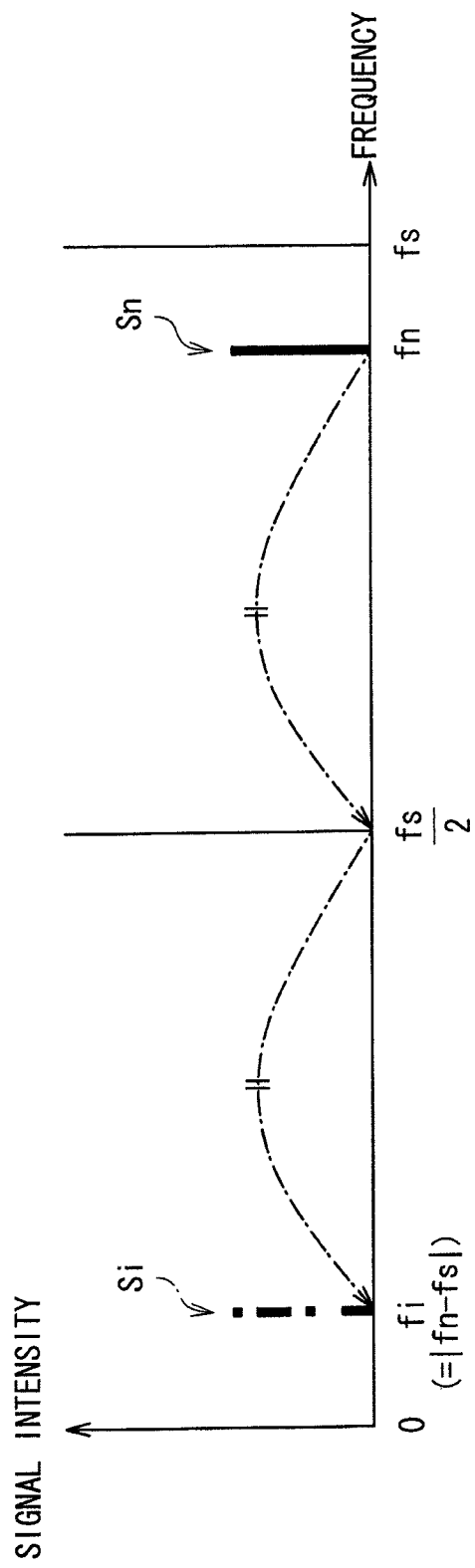
FIG. 13 is a schematic plot for describing a relationship between a sampling frequency and folding noise of external noise.

In this case, FIG. 13 schematically illustrates an example of a relationship (a relationship of frequency characteristics) between such external noise Sn, the folding noise Si thereof and the sampling frequencies fs in the A/D converter section 83 (the sampling sections 834, 835 and 836).

First, in the embodiment, an LPF is not provided in a former stage of the A/D converter section 83. Moreover, to reduce power consumption, it is preferable not to set the sampling frequencies fs (=4f0, 5f0 and 6f0) to a value higher than necessary. Therefore, in the embodiment, as illustrated in FIG. 13, a frequency fn of the external noise Sn may exceed ½ (fs/2) of the sampling frequency fs, and in this case, the folding noise Si of the external noise Sn is generated. In this case, a frequency (folding frequency) fi of the folding noise Si is represented by the following expression (1), where the frequency of the external noise Sn is fn and the sampling frequency is fs. By the expression (1), as described above, it is obvious that in the case where the sampling frequencies fs are different from one another (in the detection signals Sin4, Sin5 and Sin6), even if the external noise Sn is the same, in principle, frequencies (the folding frequencies fi) where the folding noise Si is generated are different from one another. In addition, as will be described in detail later, even if the sampling frequencies fs are different from one another, the folding frequencies fi may be equal to one another because of the following reason. In the expression (1), when a coefficient n is set to the lowest common multiple of a plurality of coefficients n (for example, n1, n2 and the like) corresponding to different sampling frequencies fs, the folding frequencies fi are equal to one another.

$$fi=|fn-n\times fs|\text{ (}n\text{ is an integer)} \quad (1)$$

2-1. Procedures of Whole Noise Removal Process

Figure 14:
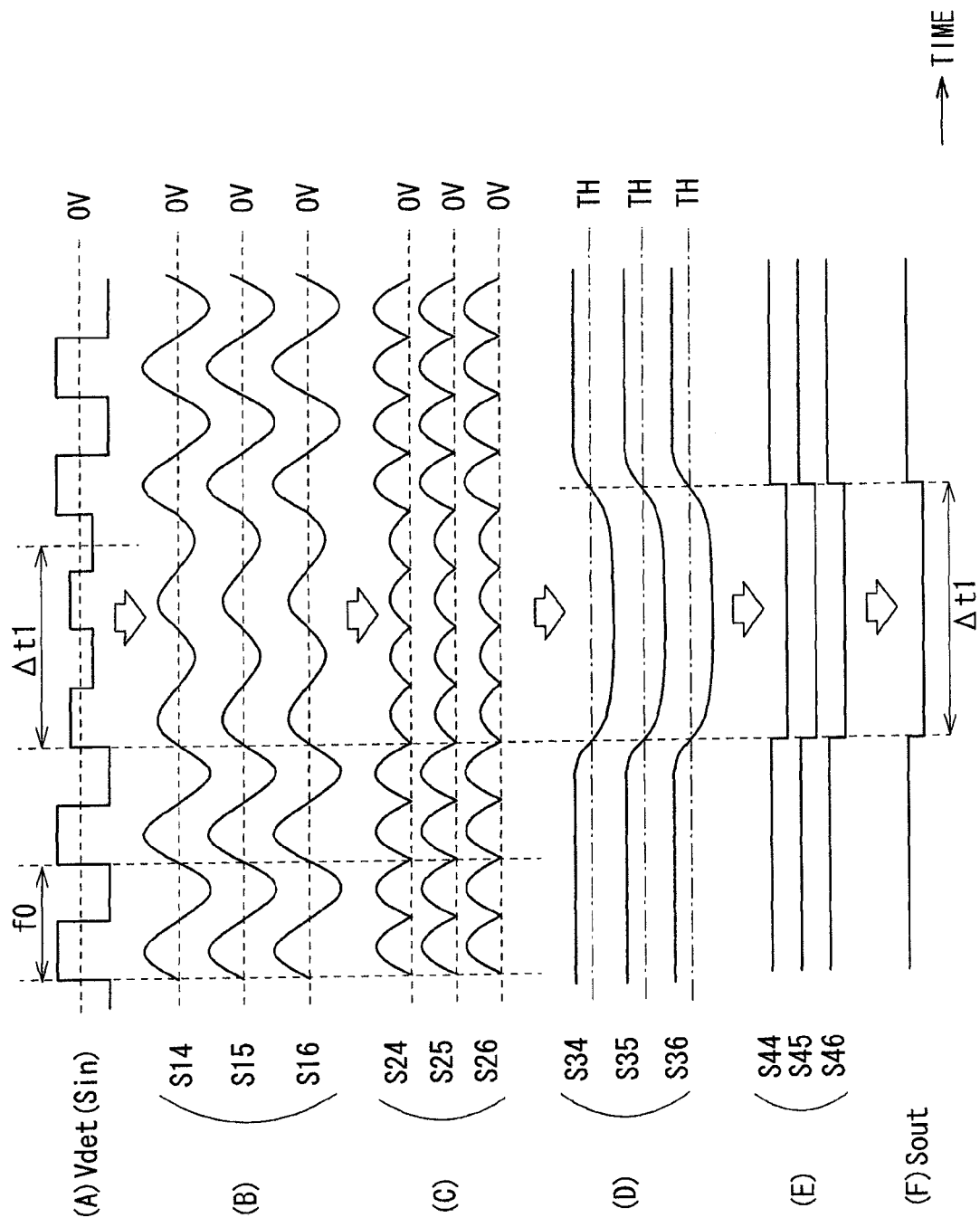
FIG. 14 is a timing waveform chart for describing procedures of a method of removing external noise according to the first embodiment.
Figure 15:
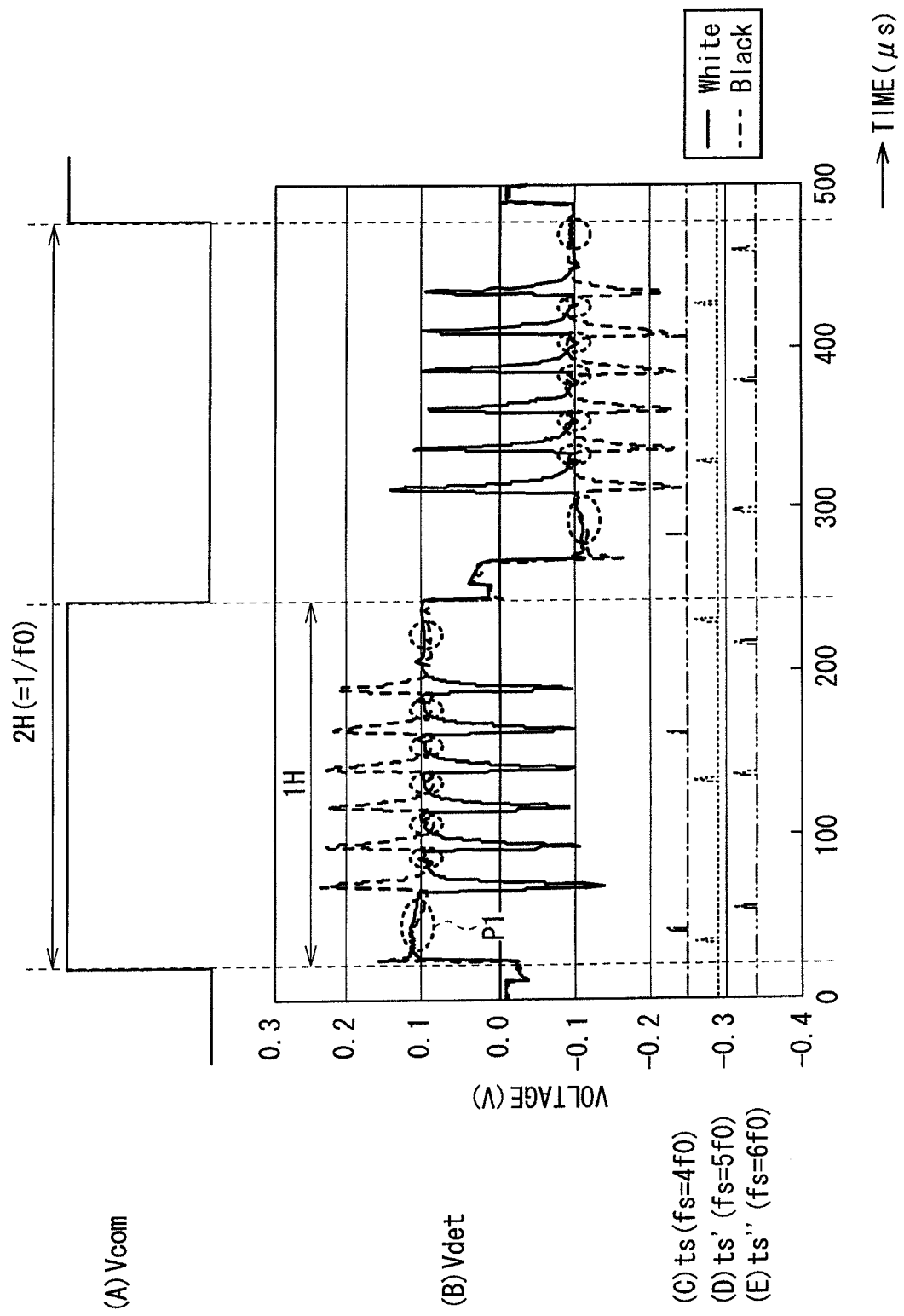
FIG. 15 is a timing waveform chart illustrating an example of a relationship between noise (internal noise) caused by a display writing operation in a detection operation and a sampling timing in A/D conversion.
Figure 16:
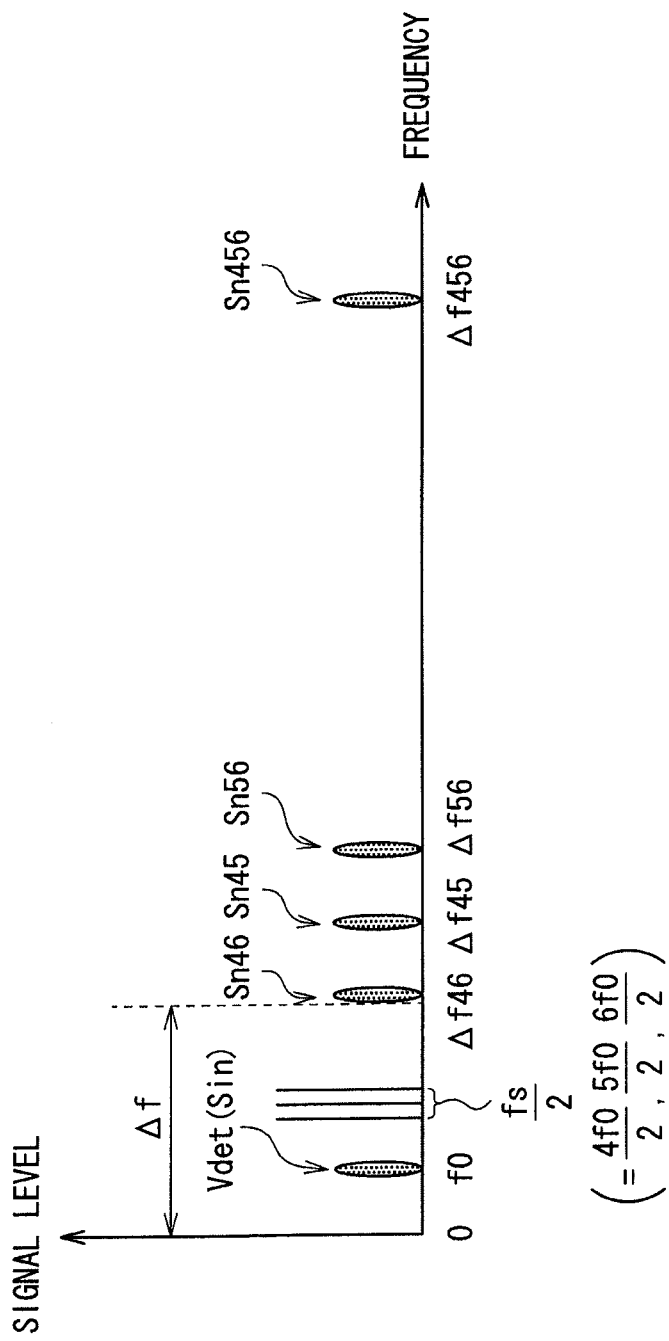
FIG. 16 is a schematic plot for describing an example of frequencies regions of a detection signal and external noise in a method of removing external noise according to the first embodiment.

In the embodiment, in the A/D converter section 83, the signal processing section 84 and the coordinate extraction section 85 in the detection circuit 8, for example, as illustrated in FIGS. 14 to 16 which will be described later, object detection with no (or less) influence of the above-described external noise (and internal noise) is performed.

FIG. 14 illustrates procedures of a method of removing (reducing) such external noise with a timing waveform chart. In the drawing, parts A, B, C, D, E and F illustrate the detection signals Vdet and Sin before and after sampling, the detection signals S14, S15 and S16, the detection signal S24, S25 and S26, the detection signals S34, S35 and S36, the detection signal S44, S45 and S46, and the detection signal Sout, respectively, (refer to FIG. 9 for details of each detection signal).

First, the A/D converter section 83 in the detection circuit 8 samples the analog detection signal Vdet amplified by the amplification section 81 at the predetermined sampling timing ts to supply the detection signal Sin obtained by sampling to the signal processing section 84. More specifically, in the sampling sections 834, 845 and 836 in the A/D converter section 83, for example, as illustrated in parts C to E in FIG. 15, sampling of the detection signal Vdet is performed at different sampling timings ts, ts' and ts" (the sampling frequencies fs=4f0, 5f0 and 6f0).

At this time, for example, as illustrated in parts A and B in FIG. 15, internal noise caused by a writing operation of an image signal in image display control is generated in the waveform of the actual detection signal Vdet, and waveform fluctuations according to the gradation level of the image signal occur. More specifically, when black is written (refer to "Black" in the drawing), internal noise which is in phase with the common drive signal Vcom is included, and when white is written (refer to "White" in the drawing), internal noise which is out of phase with the common drive signal Vcom is included. The waveform of the detection signal Vdet fluctuates according to the gradation level of the image signal at such a generation timing of internal noise, so a change in a detected waveform (refer to FIG. 3) caused by whether or not an object touches the sensor detection electrode 44 is difficult to be isolated from fluctuations in the waveform of the detection signal Vdet.

Therefore, the sampling sections 834, 835 and 836 sample the detection signal Vdet in response to the timing control signals CTL24, CTL 25 and CTL 26 supplied from the timing control section 9, respectively at a timing other than a generation timing of internal noise. More specifically, the sampling timings ts, ts' and ts" (fs=4f0, 5f0 and 6f0) in the sampling sections 834, 835 and 836 illustrated in the parts C to E in FIG. 15 avoid coinciding with the generation timing of internal noise as illustrated in a reference numeral P1 in the part B in FIG. 15. Thereby, object detection with no (or less) influence of internal noise is allowed.

Next, in the signal processing section 84, the BPFs 844A, 845A and 846A perform a predetermined filter process on the detection signals Sin (Sin4, Sin5 and Sin6) obtained by sampling in the sampling sections 834, 835 and 836, respectively. More specifically, the BPFs 844A, 845A and 846A selectively allow signals (the detection signals S14, S15 and S16), contained in the detection signals Sin4, Sin5 and Sin6 and having a frequency same as the fundamental frequency f0 of the common drive signal Vcom, to pass therethrough, respectively (refer to a part B in FIG. 14). At this time, in the detection signals Sin4, Sin5 and Sin6, the sampling frequencies fs are different from one another (fs=4f0, 5f0 and 6f0), so in principle (except for the case where the folding frequencies fi are equal to one another), one at most of the detection signals Sin4, Sin5 and Sin6 is affected by the folding noise Si of the external noise Sn. In other words, in the case where a detection signal affected by the folding noise Si is present in the detection signals Sin4, Sin5 and Sin6 (the detection signals S14, S15 and S16), the waveform of the detection signal is deformed.

Next, the absolute value converter sections 844C, 845C and 846C perform absolute value conversion with respect to a voltage value of 0 (zero) (a process of inverting negative portions of a signal waveform with respect to 0 V as a center) on the detection signals S14, S15 and S16 having passed through the BPFs 844A, 845A and 846A. Thereby, the detection signals S24, S25 and S26 are produced (refer to a part C in FIG. 14).

Then, the LPFs 844D, 845D and 846D perform an LPF process of selectively allowing only a frequency of a signal corresponding to the object to be detected to pass therethrough (selectively extracting the frequency) on the detection signals S24, S25 and S26 obtained by the absolution value conversion. Thereby, the detection signals S34, S35 and S36 are produced (refer to a part D in FIG. 14).

Next, the binarization sections 844E, 845E and 846E perform a binarization process on the detection signal S34, S35 and S36 having passed through the LPFs 844D, 845D and 846D, respectively, by comparing the detection signal S34, S35 and S36 with a predetermined threshold value TH. Thereby, the detection signals S44, S45 and S46 are produced (refer to a part E in FIG. 14). At this time, as described above, in principle, one at most of the detection signals S44, S45 and S46 may be affected by the folding noise Si of the external noise Sn, thereby to deform the waveform of the detection signal affected by the folding noise Si.

Next, the majority selection section 840 performs a predetermined majority rule operation using the detection signals S44, S45 and S46 to output the final detection signal Sout used for object detection to the coordinate extraction section 85. More specifically, a detection signal decided by majority in three detection signals S44, S45 and S46 (in this case, two or more of detection signals S44, S45 and S46 have the same value) is used to be outputted as the detection signal Sout (refer to a part F in FIG. 14). In this case, such a majority rule operation is performed, and the detection signal decided by the majority is used as the final detection signal Sout for object detection because of the following reason. As described above, it is because in principle, one at most of the detection signals S44, S45 and S46 may be affected by the folding noise Si of the external noise Sn, thereby to deform the waveform of the detection signal affected by the folding noise Si. Therefore, when the detection signal decided by the majority is used as the final detection signal Sout for object detection, the influence of such folding noise Si of the external noise Sn is allowed to be removed (reduced).

Then, in the coordinate extraction section 85, an object detection result is determined based on the detection signal Sout decided in such a manner (the detection signal Sout obtained by removing (reducing) the internal noise or the external noise) to be outputted from the output terminal Tout. Thus, object detection with no (or less) influence of the external noise (and the internal noise) in the embodiment is completed.

2-2. Characteristic Functions in Noise Removal Process

Now, referring to FIG. 16, characteristic functions in the above-described noise removal process will be described in detail below. FIG. 16 schematically illustrates a relationship between frequency regions of the detection signal Vdet (Sin) and the external noise Sn and the sampling frequencies fs.

First, in the embodiment, the sampling sections 834, 835 and 836 in the A/D converter section 83 perform sampling of the detection signal Vdet at different sampling frequencies fs (=4f0, 5f0 and 6f0), respectively (refer to parts C to E in FIG. 15). Then, the signal processing section 84 and the coordinate extraction section 85 perform an object detection operation based on three detection signals Sin4, Sin5 and Sin6 obtained by the sampling. Thereby, even if the folding noise Si of the external noise Sn is generated around a frequency region (the fundamental frequency f0) of the detection signal Vdet (Sin), in the detection signals Sin4, Sin5 and Sin6, the folding frequencies fi easily differ from one another. In addition, the waveform of the detection signal Vdet (Sin) is formed by modulating the amplitude or frequency of the waveform (the fundamental frequency f0) of the common drive signal Vcom which is a detection drive signal.

In other words, as will be described in detail below, in the detection signals Sin4, Sin5 and Sin6, the frequency of the external noise Sn where the folding frequencies fi in a plurality of detection signals are equal to one another is limited to a partial frequency region. More specifically, for example, as illustrated in FIG. 16, the frequency of the external noise Sn where the folding frequencies fi are equal to one another is limited to partial regions Δf46, Δf45, Δf56 and Δf456 on a higher frequency side than the detection signal Vdet (Sin). In this case, the frequency region Δf46 means a frequency region of the external noise Sn where the folding frequencies fi in the detection signals Sin4 and Sin6 are equal to each other. Likewise, the frequency region Δf45 means a frequency region of external noise Sn46 where frequencies fi in the detection signals Sin4 and Sin5 are equal to each other, and the frequency region Δf56 means a frequency region of external noise Sn56 where folding frequencies fi in the detection signals Sin5 and Sin6 are equal to each other. Moreover, the frequency region Δf456 means a frequency region of external noise Sn456 where the folding frequencies in the detection signals Sin4, Sin5 and Sin6 are equal to one another.

Therefore, in the embodiment, the detection signals (the detection signals Sin4, Sin5, Sin6 and the like) are easily distinguished (isolated) from the folding noise Si of the external noise Sn. Thereby, unlike related art, a detection operation with less influence of the external noise Sn (the folding noise Si) is allowed to be performed without changing a detection drive frequency (the fundamental frequency f0 of the common drive signal Vcom).

Hereinafter the frequency regions Δf46, Δf45, Δf56 and Δf456 of the external noise Sn where folding frequencies fi in a plurality of detection signals of the detection signals Sin4, Sin5 and Sin6 are equal to one another will be described in detail below.

First, when the sampling frequencies fs=4f0, 5f0 and 6f0 for obtaining the detection signals Sin4, Sin5 and Sin6 are substituted into the above-described expression (1), the following expressions (2) to (4) are obtained, respectively. In addition, the coefficient n in the expression (1) in each case is defined as n, m or k.

$$fi=|fn-n\times 4f0|(n \text{ is an integer}) \quad (2)$$

$$fi=|fn-m\times 5f0|(m \text{ is an integer}) \quad (3)$$

$$fi=|fn-k\times 6f0|(k \text{ is an integer}) \quad (4)$$

Thereby, the folding frequencies corresponding to the above-described frequency regions Δf46, Δf45, Δf56 and Δf456 are represented by the following expressions (5) to (8). In other words, conditional expressions where the folding frequencies fi in a plurality of (two or more) detection signals of the detection signals Sin4, Sin5 and Sin6 are equal to one another are the following expressions (5) to (8).

$$\Delta f46: fi=|fn-n\times 4f0|=|fn-k\times 6f0| \quad (5)$$

$$\Delta f45: fi=|fn-n\times 4f0|=|fn-m\times 5f0| \quad (6)$$

$$\Delta f56: fi=|fn-m\times 5f0\uparrow=\uparrow fn-k\times 6f0| \quad (7)$$

$$\Delta f456: fi=|fn-n\times 4f0|=|fn-m\times 5f0|=|fn-k\times 6f0| \quad (8)$$

Herein, the smallest coefficients n and k to satisfy the above-described expression (5) correspond to "12" which is the least common multiple of "4" and "6", so the smallest coefficients n and k satisfy the expression (5) when n×4=k×6=12 is established, that is, when n is 3 and k is 2. Likewise, the coefficients n and m to satisfy the above-described expression (6) correspond to "20" which is the least common multiple of "4" and "5", so the coefficient n and m satisfy the expression (6) when n×4=m×5=20 is established, that is, when n is 5 and k is 4. Moreover, the coefficients m and k to satisfy the above-described expression (7) corresponds to "30" which is the least common multiple of "5" and "6", so the coefficients m and k satisfy the expression (7) when the m×5=k×6=30 is established, that is, when m is 6 and k is 5. Further, the coefficients n, m and k to satisfy the above-described expression (8) correspond to "60" which is the least common multiple of "4", "5" and "6", so the coefficients n, m and k satisfy the expression (8) when n×4=m×5=k×6=60 is established, that is, when n is 15, m is 12 and k is 5.

Therefore, the above-described expressions (5) to (8) may be modified to the following expressions (9) to (12).

$$\Delta f46: fi=|fn-12f0| \quad (9)$$

$$\Delta f45: fi=|fn-20f0| \quad (10)$$

$$\Delta f56: fi=|fn-30f0| \quad (11)$$

$$\Delta f456: fi=|fn-60f0| \quad (12)$$

Moreover, when the following expression (13) as a conditional expression where the folding noise Si is generated is substituted into each of the above-described expressions (9) to (12) to modify the expressions (9) to (12), the following expressions (14) to (17) are obtained.

$$0<fi<(f0/2) \quad (13)$$

$$\Delta f46: 11.5f0=<fn(\text{frequency of } Sn46)<12.5f0 \quad (14)$$

$$\Delta f45: 19.5f0=<fn(\text{frequency of } Sn56)<20.5f0 \quad (15)$$

$$\Delta f56: 29.5f0=<fn(\text{frequency of } Sn56)<30.5f0 \quad (16)$$

$$\Delta f456: 59.5f0=<fn(\text{frequency of } Sn456)<60.5f0 \quad (17)$$

Then, as an example, when the fundamental frequency f0=11.2 kHz (a detection drive frequency) of the common drive signal Vcom is substituted into each of the above-described expressions (14) to (17) to modify the expressions (14) to (17) are modified, the following expressions (18) to (21) are obtained.

$$\Delta f46: 128.8 \text{ kHz}<fn<140.0 \text{ kHz} \quad (18)$$

$$\Delta f45: 218.4 \text{ kHz}<fn<229.6 \text{ kHz} \quad (19)$$

$$\Delta f56: 330.4 \text{ kHz}<fn<341.6 \text{ kHz} \quad (20)$$

$$\Delta f456: 666.4 \text{ kHz}<fn<677.6 \text{ kHz} \quad (21)$$

Thereby, it is clear that frequency regions Δf46, Δf45 and Δf56 and Δf456 of the external noise Sn where the folding frequencies fi in two or more of the detection signals Sin4, Sin5 and Sin6 are equal to each other are limited to a partial region on a higher frequency side than the detection signal Vdet (Sin). In other words, as illustrated in FIG. 16, the frequency region of the external noise Sn interfering with a detection operation by the influence of the folding noise Si is limited to a very high frequency region, so the influence of the external noise Sn in the detection operation is reduced. Moreover, even in the case where the external noise Sn is included in the above-described frequency region Δf46, Δf45, Δf56 or Δf456, the BPFs 844A, 845A and 846A are provided in the signal processing section 84, so also in this case, the influence of the external noise Sn is reduced. In other words, these BPFs 844A, 845A and 846A selectively allow the fundamental frequency f0 (the detection drive frequency) of the common drive signal Vcom to pass therethrough, so even in such a case, the influence of the external noise Si is allowed to be reduced.

Thus, in the embodiment, as described above, the detection signals (the detection signals Sin4, Sin5, Sin6 and the like) are easily distinguished (isolated) from the folding noise Si of the external noise Sn. In other words, in principle, one at most (0 in most cases) of the detection signals (the detection signals Sin4, Sin5, Sin6 and the like) is affected by the folding noise Si of the external noise Sn, thereby to deform the waveform of the detection signal affected by the folding noise Si of the external noise Sn. Therefore, as described above, when a detection signal decided by majority is the final detection signal Sout for object detection, the influence of the external noise Sn is allowed to be removed (reduced). Therefore, unlike related art, a detection operation with less influence of the external noise Sn (the folding noise Si) is allowed to be performed without changing the detection drive frequency (the fundamental frequency f0 of the common drive signal Vcom).

In addition, at this time, in the case where the frequency fn of the external noise Sn is equal to the fundamental frequency f0 (the detection drive frequency) of the common drive signal Vcom, the detection signals (the detection signals Sin4, Sin5, Sin6 and the like) are difficult to distinguish (be isolated) from the external noise Sn. Therefore, the fundamental frequency f0 of the common drive signal Vcom is preferably set to be lower than the estimated frequency fn of the external noise Sn. For example, the frequency fn of an inverter fluorescent lamp as a typical noise source is 40 kHz to 100 kHz, so the fundamental frequency of the common drive signal Vcom is preferably set to 40 kHz or less. Thereby, the external noise interfering with the detection operation is observed in only the folding noise Si thereof, so a technique of reducing noise (a technique of distinguishing a detection signal from folding noise) according to the embodiment is effective.

As described above, in the embodiment, a position touched by (in proximity to) the object is detected based on the detection signal Vdet obtained from the sensor detection electrode 44 according to a change in capacitance, and in the detection, the detection signal Vdet is sampled at three different sampling frequencies fs to produce three detection signals Sin4, Sin5 and Sin6, and a detection operation is performed based on the three detection signals Sin4, Sin5 and Sin6, so the detection signals (the detection signals Sin4, Sin5, Sin6 and the like) are easily distinguished (isolated) from the folding noise Si of the external noise Sn, and a detection operation with less influence of external noise Sn is allowed to be performed without changing the detection drive frequency (the fundamental frequency f0). Therefore, stable object detection is allowed to be performed with a simple configuration irrespective of external environments.

Second Embodiment

Next, a second embodiment of the invention will be described below. The embodiment is distinguished from the above-described first embodiment by the fact that a transverse electric mode liquid crystal element is used as a display element.

Configuration Example of Display 1B

Figure 17:
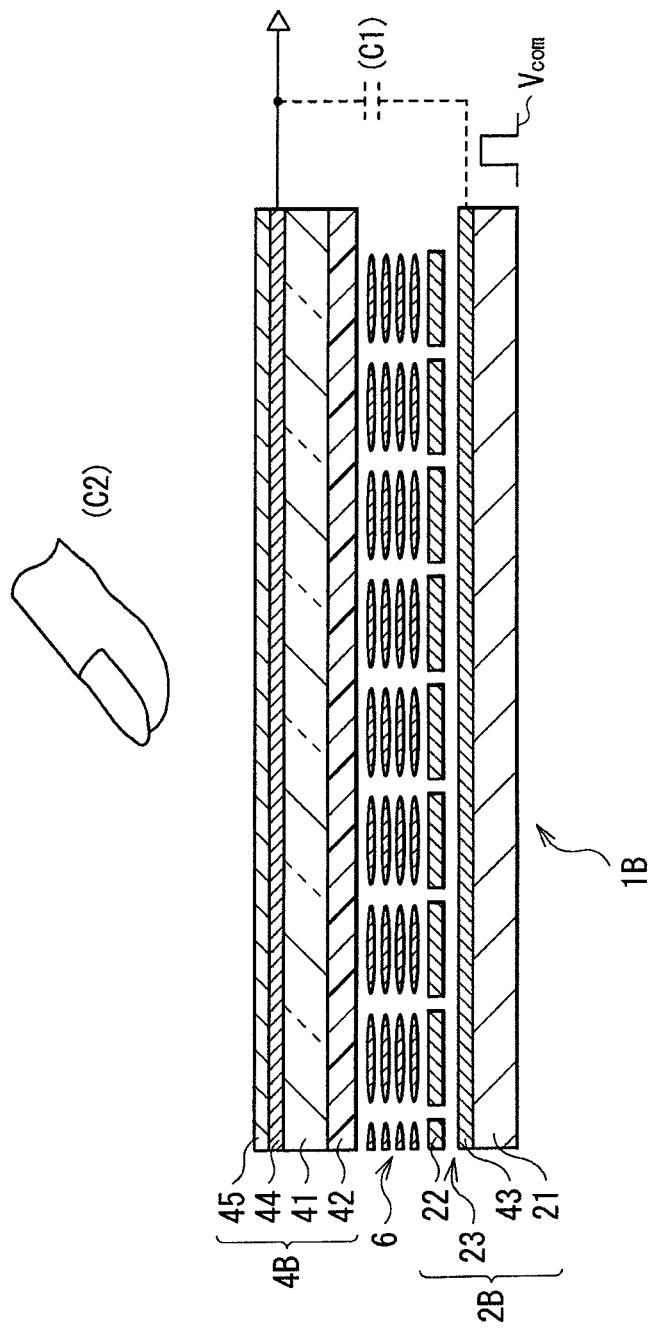
FIG. 17 is a schematic sectional view of a display with a touch sensor according to a second embodiment of the invention.
Figure 18B:
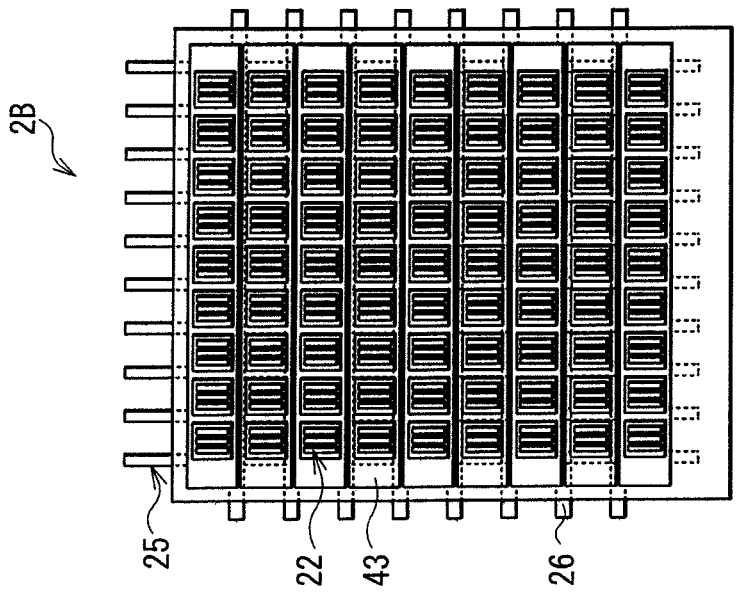
FIGS. 18A and 18B are a sectional view and a plan view illustrating a specific configuration of a part of a pixel substrate in the display illustrated in FIG. 17.
Figure 18A:
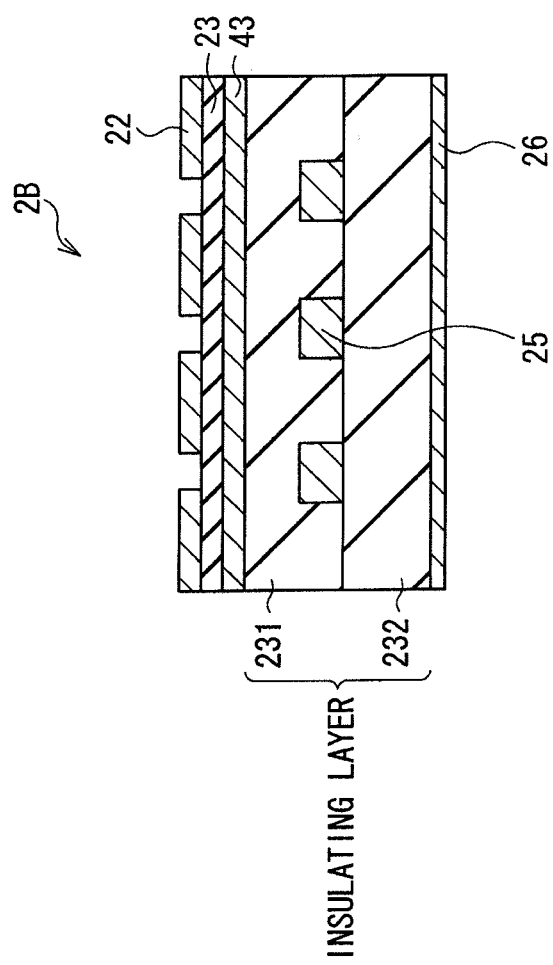
Figure 19B:
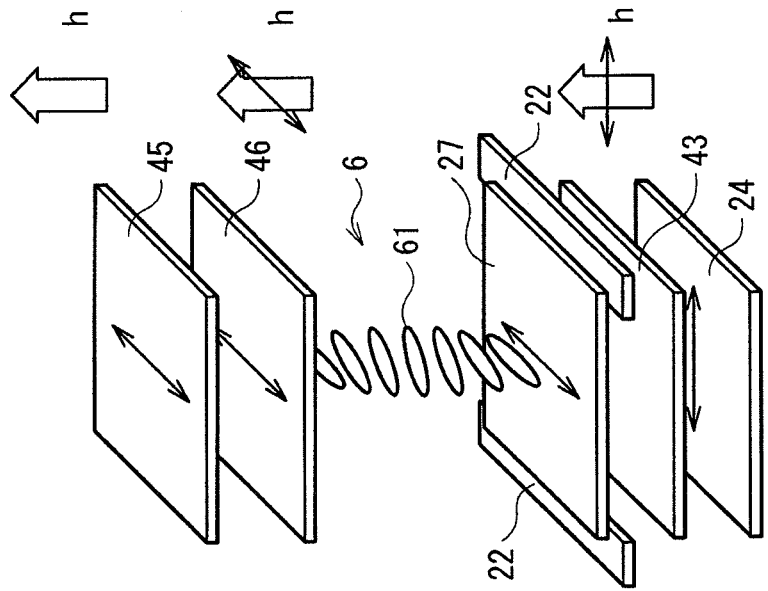
FIGS. 19A and 19B are enlarged perspective views of a main part of the display illustrated in FIG. 17.
Figure 19A:
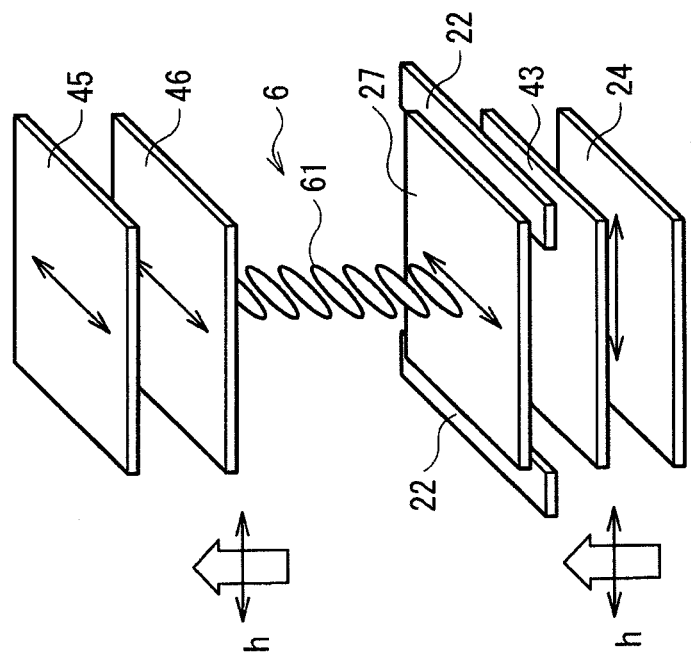

FIG. 17 illustrates a sectional view of a main part of a display 1B with a touch sensor according to the embodiment. FIGS. 18A and 18B illustrate a sectional view and a plan view of a specific configuration of a pixel substrate (a pixel substrate 2B which will be described later) in the display 1B, respectively. FIG. 19 illustrates a perspective view of the display 1B. In addition, in these drawings, like components are denoted by like numerals as of FIG. 4 and the like in the above-described first embodiment and will not be further described.

The display 1B according to the embodiment includes a pixel substrate 2B, an opposed substrate 4B arranged to face the pixel substrate 2B and a liquid crystal layer 6 arranged between the pixel substrate 2B and the opposed substrate 4B.

The pixel substrate 2B includes the TFT substrate 21, the common electrode 43 arranged on the TFT substrate 21 and a plurality of pixel electrodes 22 arranged in a matrix form on the common electrode 43 with an insulating layer 23 in between. In the TFT substrate 21, in addition to a display driver and a TFT (both not illustrated) for driving each of the pixel electrodes 22, wirings such as a signal line (a source line) 25 for supplying an image signal to each of the pixel electrodes 22 and a gate line 26 driving each TFT are formed (refer to FIG. 18). The detection circuit 8 (refer to FIG. 8) performing a touch detection operation is also formed in the TFT substrate 21. The common electrode 43 doubles as a sensor drive electrode configuring a part of the touch sensor performing the touch detection operation, and corresponds to the drive electrode E1 in FIG. 1.

The opposed substrate 4B includes the glass substrate 41 and the color filter 42 formed on one surface of the glass substrate 41. The sensor detection electrode 44 is formed on the other surface of the glass substrate 41, and the polarizing plate 45 is arranged on the sensor detection electrode 44. The sensor detection electrode 44 configures a part of the touch sensor, and corresponds to the detection electrode E2 in FIG. 1. As illustrated in FIG. 5, the sensor detection electrode 44 is divided into a plurality of electrode patterns. The sensor detection electrode 44 may be formed directly or indirectly on the opposed substrate 4B by a thin film process. In this case, the sensor detection electrode 44 may be formed on a film base (not illustrated), and the film base on which the sensor detection electrode 44 is formed may be bonded to the surface of the opposed substrate 4B. In this case, the film base may be bonded to a top surface of the polarizing plate instead of between a glass and the polarizing plate, and may be formed in a film configuring a polarizing plate.

The common drive signal Vcom with an AC rectangular waveform is applied from the TFT substrate 21 to the common electrode 43. The common drive signal Vcom determines a display voltage of each pixel with a pixel voltage applied to the pixel electrodes 22, and the common drive signal Vcom doubles as a touch sensor drive signal, and corresponds to an AC rectangular wave Sg supplied from the drive signal source S in FIG. 1.

The liquid crystal layer 6 modulates light passing therethrough in response to an electric field state, and uses, for example, a transverse electric mode liquid crystal such as a FFS (Fringe Field Switching) mode or an IPS (In-Plane-Switching) mode.

For example, the configurations of the common electrode 43 in the pixel substrate 2B and the sensor detection electrode 44 in the opposed substrate 4B are the same as those illustrated in FIG. 5, and both of them are configured of a plurality of electrode patterns extending so as to intersect each other.

Now, more specific description will be given referring to FIG. 19. In an FFS mode liquid crystal element illustrated herein, the pixel electrodes 22 patterned into a comb-tooth shape are arranged on the common electrode 43, which is formed on the pixel substrate 2B, with the insulating layer 23 in between, and an alignment film 27 is formed so as to be laid over the pixel electrodes 22. A liquid crystal layer 6 is sandwiched between the alignment film 27 and an alignment film 46 on a side facing the opposed substrate 4B. Two polarizing plates 24 and 45 are arranged in a crossed Nicols state. The rubbing directions of two alignment films 27 and 46 coincide with one of transmission axes of two polarizing plates 24 and 45. In FIG. 18, the case where the rubbing direction coincides with the transmission axis of the polarizing plate 45 on an exit side is illustrated. Moreover, the rubbing directions of two alignment films 27 and 46 and the direction of the transmission axis of the polarizing plate 45 are set substantially in parallel to a direction where the pixel electrodes 22 extend (in a longitudinal direction of a comb tooth) in a range in which a direction where liquid crystal molecules are rotated is specified.

Functions and Effects of Display 1B

Next, functions and effects of the display 1B according to the embodiment will be described below.

Figure 20A:
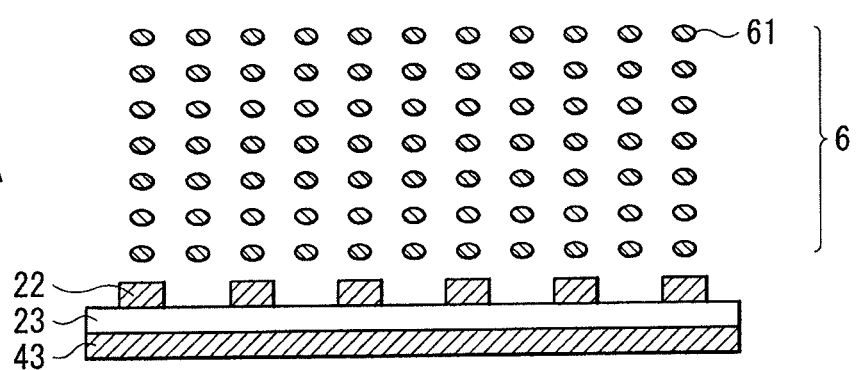
FIGS. 20A and 20B are sectional views for describing an operation of the display illustrated in FIG. 17.
Figure 20B:
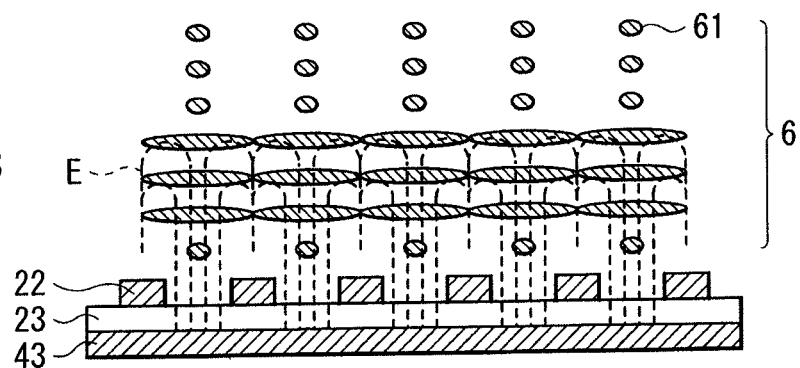

First, referring to FIGS. 19A, 19B, 20A and 20B, a display operation principle of the FFS mode liquid crystal element will be briefly described below. Herein, FIGS. 20A and 20B illustrate enlarged sectional views of a main part of the liquid crystal element. In these drawings, FIGS. 19A and 20A, and 19B and 20B indicate a state of the liquid crystal element when an electric field is not applied and a state of the liquid crystal element when an electric field is applied, respectively.

In a state in which a voltage is not applied between the common electrode 43 and the pixel electrodes 22 (refer to FIGS. 19A and 20A), the axes of liquid crystal molecules 61 configuring the liquid crystal layer 6 are orthogonal to the transmission axis of the polarizing plate 24 on an incident side, and are parallel to the transmission axis of the polarizing plate 45 on an exit side. Therefore, incident light h having passed through the polarizing plate 24 on the incident side reaches the polarizing plate 45 on the exit side without generating a phase difference in the liquid crystal layer 6 and then the incident light h is absorbed in the polarizing plate 45, so black is displayed. On the other hand, in a state in which a voltage is applied between the common electrode 43 and the pixel electrodes 22 (refer to FIGS. 19B and 20B), the alignment direction of the liquid crystal molecules 61 is rotated in a diagonal direction from the direction where the pixel electrodes 22 extend by a transverse electric field E generated between the pixel electrodes. At this time, electric field strength in white display is optimized so that the liquid crystal molecules 61 located in the center in a thickness direction of the liquid crystal layer 6 is rotated by approximately 45°. Thereby, in the incident light h having passing through the polarizing plate 24 on the incident side, a phase difference is generated while the light h passes through the liquid crystal layer 6, thereby the light h is turned into linear polarized light which is rotated by 90°, and passes through the polarizing plate 45 on the exit side, so white is displayed.

Next, a display control operation and a touch detection operation in the display 1B will be described below. These operations are the same as operations in the above-described first embodiment, and will not be described in detail.

A display driver (not illustrated) of the pixel substrate 2B line-sequentially supplies the common drive signal Vcom to the electrode patterns of the common electrode 43. The display driver also supplies an image signal to the pixel electrodes 22 through the source lines 25, and line-sequentially controls switching of TFTs of pixel electrodes through the gate lines 26 in synchronization with the supply of the image signal to the pixel electrodes 22. Thereby, an electric field in a transverse direction (a direction parallel to a substrate) determined by the common drive signal Vcom and each image signal is applied to the liquid crystal layer 6 in each pixel to modulate a liquid crystal state. Thus, display by a so-called reverse drive is performed.

On the other hand, on the opposed substrate 4B side, the common drive signal Vcom is sequentially applied to the electrode patterns of the common electrode 43 in a time-dimensional manner. Then, the capacitive elements C1 (C11 to C1n) in one line formed at intersections of the electrode patterns of the common electrode 43 and the electrode patterns of the sensor detection electrode 44 are charged and discharged. Then, the detection signal Vdet with a magnitude according to the capacity value of the capacitive element C1 is outputted from each of the electrode patterns of the sensor detection electrode 44. In a state where a finger of a user does not touch a surface of the opposed substrate 4A, the magnitude of the detection signal Vdet is substantially constant. When the finger of the user touches a position on the surface of the opposed substrate 4B, the capacitive element C2 by the finger is added to the capacitive element C1 originally formed in the touched position, and as a result, the value of the detection signal Vdet when the touched position is scanned is smaller than that when other positions are scanned. The detection circuit 8 (refer to FIG. 8) compares the detection signal Vdet with the threshold voltage Vth to determine the position as a touched position in the case where the detection signal Vdet is smaller than the threshold voltage Vth. The touched position is determined based on a timing of applying the common drive signal Vcom and a timing of detecting the detection signal Vdet which is smaller than the threshold voltage Vth.

As described above, in the embodiment, as in the case of the above-described first embodiment, the capacitive type touch sensor is configured so that the common electrode 43 originally included in the liquid crystal display element doubles as one of a pair of touch sensor electrodes configured of a drive electrode and a detection electrode, and the common drive signal Vcom as a display drive signal doubles as a touch sensor drive signal, so only the sensor detection electrode 44 is additionally arranged, and it is not necessary to additionally prepare a touch sensor drive signal. Therefore, the configuration of the display 1B with the touch sensor is simple.

Moreover, also in the embodiment, the detection circuit 8 described in the above-described first embodiment is included, so the same effects as those in the above-described first embodiment are obtainable by the same functions in the above-described first embodiment. In other words, in the display with a capacitive type touch sensor, stable object detection is allowed to be performed with a simple configuration irrespective of external environments.

In particular, in the embodiment, the common electrode 43 as the touch sensor drive electrode is arranged on the pixel substrate 2B side (on the TFT substrate 21), so it is extremely easy to supply the common drive signal Vcom from the TFT substrate 21 to the common electrode 43, and a necessary circuit, a necessary electrode pattern, a necessary wire and the like are allowed to be centralized in the pixel substrate 2B, thereby circuits are integrated. Therefore, a path (the contact conductive pillar 7) for supplying the common drive signal Vcom from the pixel substrate 2 to the opposed substrate 4, which is necessary in the above-described embodiment, is not necessary, so the configuration of the display 1B with the touch sensor is further simplified.

Further, as described above, the common electrode 43 as the touch sensor drive electrode is arranged on the pixel substrate 2B side, and the source lines 25 and the gate lines 26 are arranged on the pixel substrate 2B, so in the embodiment, the display 1B has a configuration specifically susceptible to the influence of the above-described internal noise. Therefore, in the display 1B according to the embodiment, it is considered that an advantage that while the influence of the internal noise is removed as illustrated in FIG. 15, a detection operation is performed is specifically large.

In addition, the detection circuit 8 (refer to FIG. 8) may be formed in a perimeter region (a non-display region or a frame region) on the opposed substrate 4B, but the detection circuit 8 is preferably formed in a perimeter region on the pixel substrate 2B. When the detection circuit 8 is formed on the pixel substrate 2B, the detection circuit 8 is integrated with various circuit elements for display control which are originally formed on the pixel substrate 2B.

Modifications of Second Embodiment

In addition, in the embodiment, the sensor detection electrode 44 is arranged on a surface (on a side opposite to a side facing the liquid crystal layer 6) of the glass substrate 41, but the arrangement of the sensor detection electrode 44 may be modified as follows.

Figure 21:
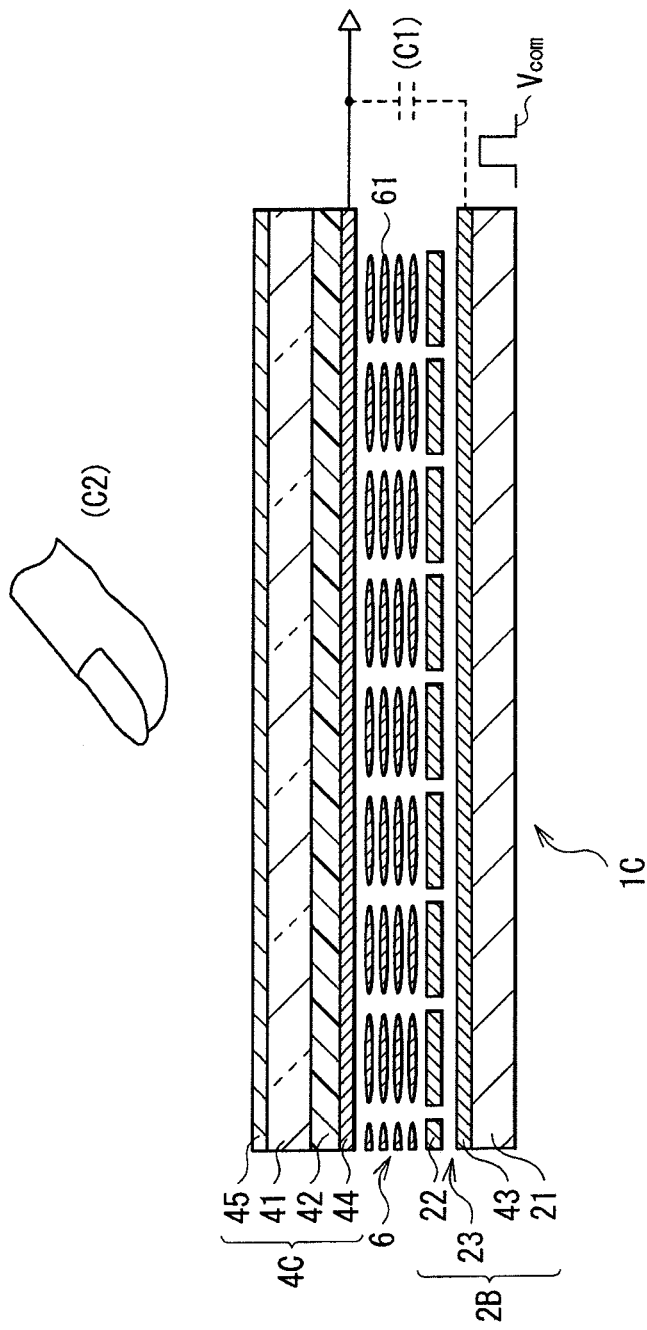
FIG. 21 is a schematic sectional view illustrating a display with a touch sensor according to a modification of the second embodiment.

For example, as in the case of a display 1C illustrated in FIG. 21, in an opposed substrate 4C, the sensor detection electrode 44 may be arranged closer to the liquid crystal layer 6 than the color filter 42.

Figure 22:
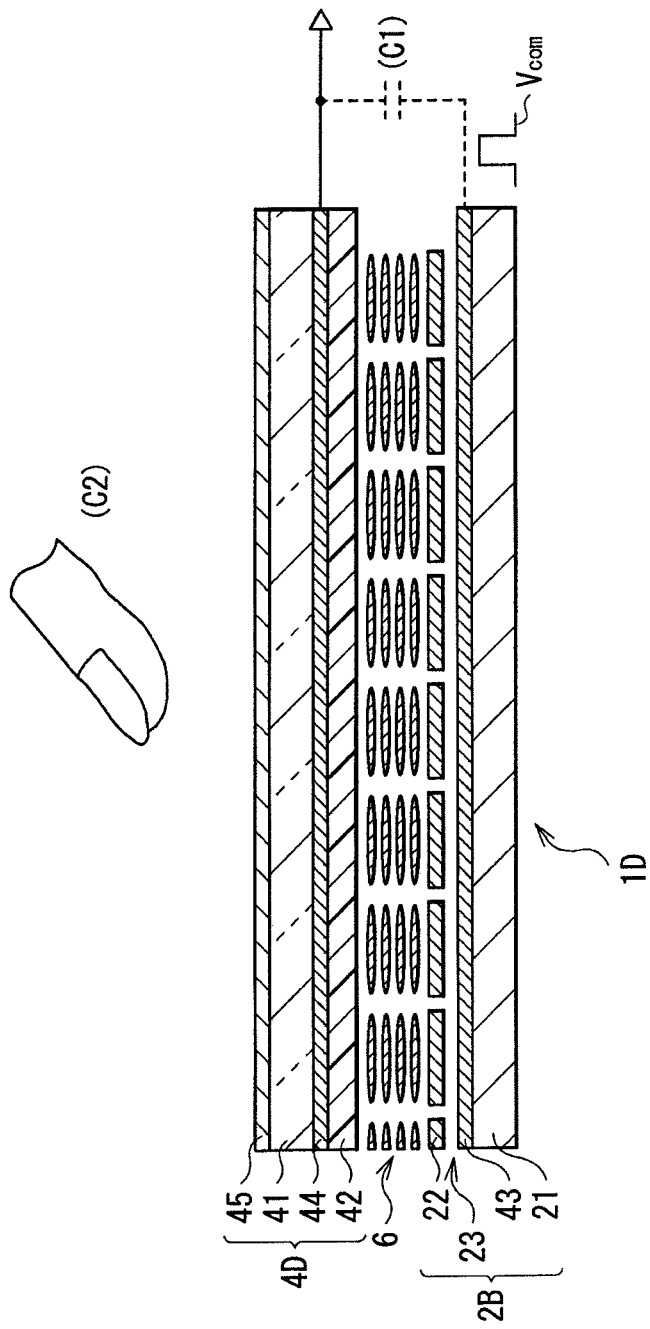
FIG. 22 is a schematic sectional view illustrating a display with a touch sensor according to another modification of the second embodiment.

Alternatively, as in the case of a display 1D illustrated in FIG. 22, in an opposed substrate 4D, the sensor detection electrode 44 may be arranged between the glass substrate 41 and the color filter 42. In this case, in the case of the transverse electric mode, when electrodes are arranged in a longitudinal direction, an electric field is applied in the longitudinal direction, and liquid crystal molecules rise, thereby to cause large degradation in viewing angle or the like. Therefore, as in the case of the display 1D, when the sensor detection electrode 44 is arranged with a dielectric such as the color filter 42 in between, this issue is allowed to be greatly reduced.

APPLICATION EXAMPLES

Next, referring to FIG. 23 to FIGS. 27A to 27G, application examples of the display with the touch sensor described in the above-described embodiments and the above-described modifications will be described below. The displays according to the above-described embodiments and the like are applicable to electronic units in any fields, such as televisions, digital cameras, notebook personal computers, portable terminal devices such as cellular phones, and video cameras. In other words, the displays according to the above-described embodiments and the like are applicable to electronic units displaying a picture signal inputted from outside or a picture signal produced inside as an image or a picture in any fields.

Application Example 1

Figure 23:
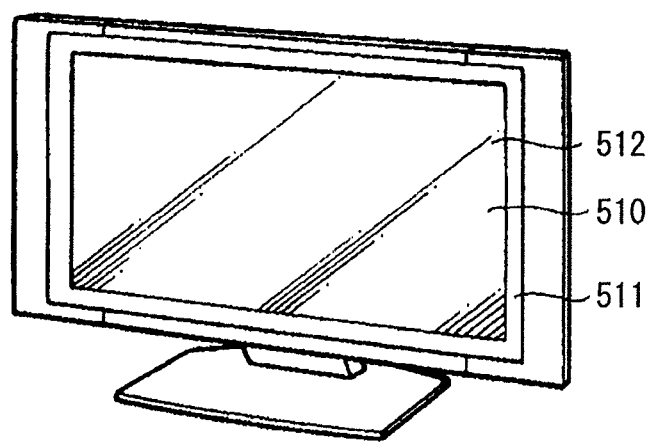

FIG. 23 illustrates an appearance of a television to which the display according to the above-described respective embodiments and the like is applied. The television has, for example, a picture display screen section 510 including a front panel 511 and a filter glass 512. The picture display screen section 510 is configured of the display according to the above-described respective embodiments and the like.

Application Example 2

Figure 24A:
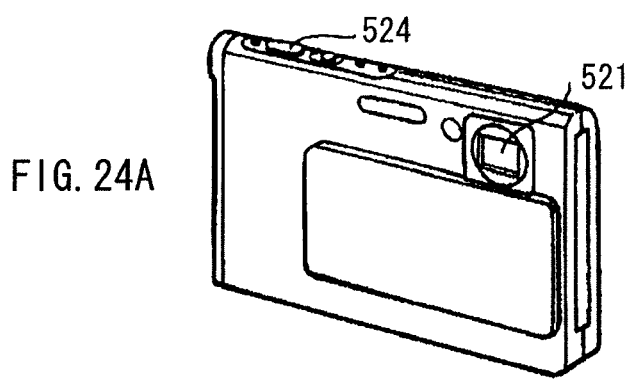
FIGS. 24A and 24B are external perspective views from the front side and the back side of Application Example 2, respectively.
Figure 24B:
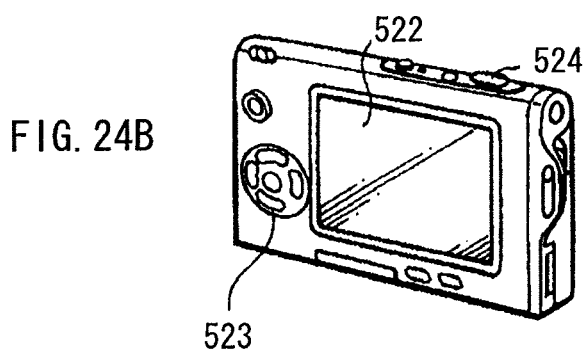

FIGS. 24A and 24B illustrate appearances of a digital camera to which the display according to the above-described respective embodiments and the like is applied. The digital camera has, for example, a light-emitting section for a flash 521, a display section 522, a menu switch 523, and a shutter button 524. The display section 522 is configured of the display according to the respective embodiments and the like.

Application Example 3

Figure 25:
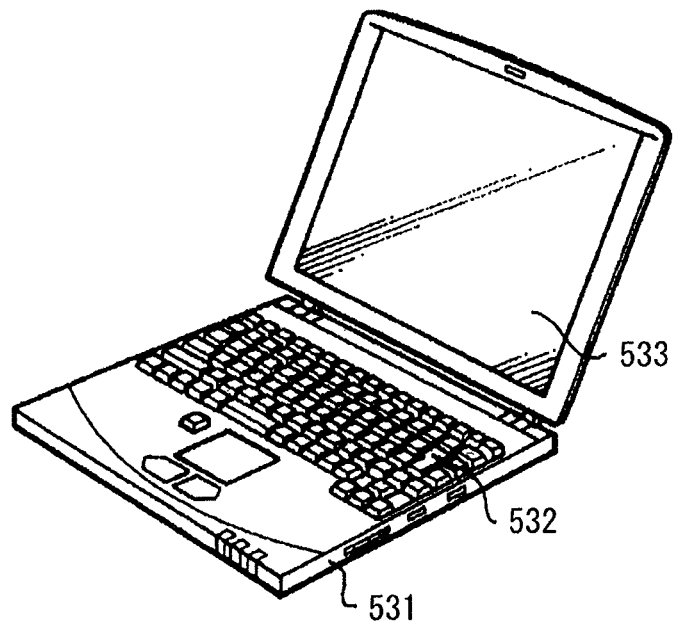
FIG. 25 is an external perspective view of Application Example 3.

FIG. 25 illustrates an appearance of a notebook personal computer to which the display according to the above-described respective embodiments and the like is applied. The notebook personal computer has, for example, a main body 531, a keyboard 532 for operation of inputting characters and the like, and a display section 533 for displaying an image. The display section 533 is configured of the display according to the above-described respective embodiments and the like.

Application Example 4

Figure 26:
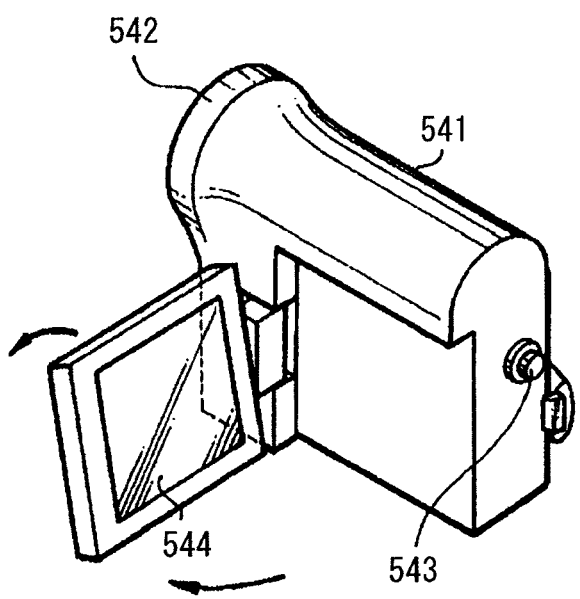
FIG. 26 is an external perspective view of Application Example 4.
Figure 27:
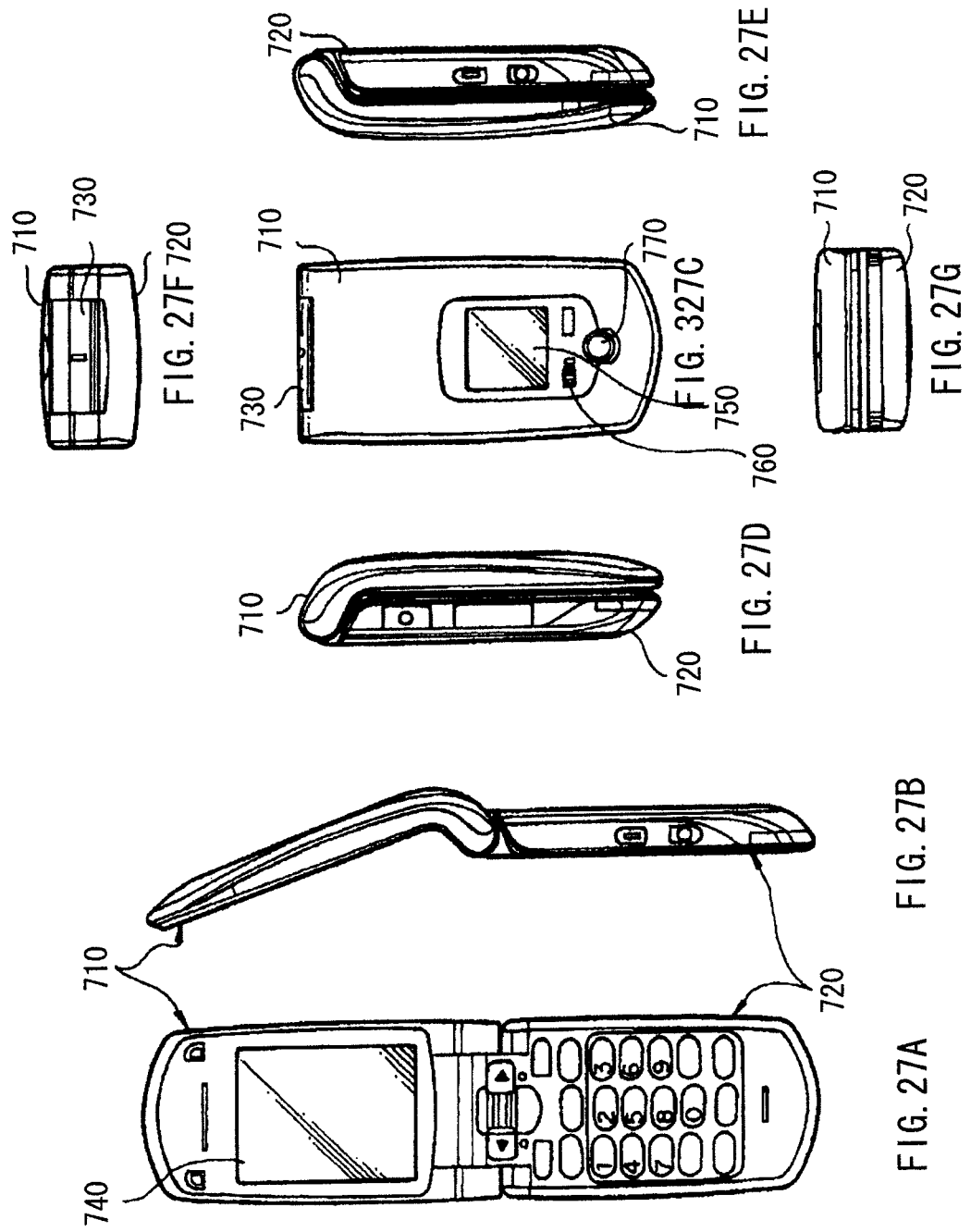
FIGS. 27A to 27G illustrate Application Example 5.

FIG. 26 illustrates an appearance of a video camera to which the display according to the above-described respective embodiments and the like is applied. The video camera has, for example, a main body 541, a lens for shooting an object 542 arranged on a front surface of the main body 541, a shooting start/stop switch 543, and a display section 544. The display section 544 is configured of the display according to the above-described respective embodiments and the like.

Application Example 5

FIGS. 27A to 27G illustrate appearances of a cellular phone to which the display according to the above-described respective embodiments and the like is applied. The cellular phone is formed by connecting, for example, a top-side enclosure 710 and a bottom-side enclosure 720 to each other by a connection section (hinge section) 730. The cellular phone has a display 740, a sub-display 750, a picture light 760, and a camera 770. The display 740 or the sub-display 750 is configured of the display according to the above-described respective embodiments and the like.

Other Modifications

Although the present invention is described referring to the embodiments, the modification examples and the application examples, the invention is not limited thereto, and may be variously modified.

For example, in the above-described embodiments and the like, the case where three sampling sections, three BPFs, three absolute value converter sections, three LPFs and three binarization sections are arranged in the A/D converter section 84 and the signal processing section 84 is described. However, the invention is not limited thereto. Four or more numbers of sampling sections, BPFs, absolute value converter sections, LPFs and binarization sections may be arranged. Moreover, in the signal processing section 84 described in the above-described embodiments and the like, the BPFs and the absolution value converter sections are not necessarily arranged. Further, in the above-described embodiments and the like, a plurality of sampling sections are arranged in the A/D converter section 83 so as to achieve a sampling operation at a plurality of different sampling frequencies fs, but the invention is not limited to this case. More specifically, one sampling section may achieve a sampling operation using a plurality of sampling frequencies fs. However, the configurations according to the above-described embodiments and the like are easily designed because the performance of the A/D converter section (the sampling sections) is allowed to be kept low.

Moreover, in the above-described embodiments and the like, the case where frequencies same as respective frequencies of four times, five times and six times as high as the fundamental frequency f0 are used as a plurality of different sampling frequencies fs is described, but the invention is not limited thereto. More specifically, for example, each of the sampling frequencies fs may be a frequency of twice or a greater integer times as high as the fundamental frequency f0, and more specifically, each of the sampling frequencies fs is not limited to a frequency of an integer times as high as the fundamental frequency f0, and the sampling frequencies fs are only necessary to be three different kinds of frequencies. Further, in particular, when multiples of the fundamental frequency f0 are increased to, for example, 7 times, 11 times, . . . , the influence of the external noise Sn is allowed to be shifted to a higher frequency side, and occasions when results by a plurality of samplings coincides with one another is reduced, so noise tolerance is allowed to be further improved. In addition, in the case where in detection signals using a plurality of sampling frequencies fs, the lowest common multiple of the sampling frequencies fs is as high as possible, the influence of the external noise Sn is allowed to be shifted to a higher frequency side. Therefore, as an example, it is considered desirable that all of a plurality of sampling frequencies fs are frequencies of a prime number times as high as the fundamental frequency f0.

Further, in the above-described second embodiment, as the transverse electric mode, the FFS mode liquid crystal element is described as an example, but an IPS mode liquid crystal is applicable in the same manner.

In addition, in the above-described embodiments and the like, the display using the liquid crystal display element as the display element is described, but the invention is applicable to a display using any other display element, for example, an organic EL element.

Moreover, in the above-described embodiments and the like, a configuration in which the touch sensor is embedded in the display (the display with the touch sensor) is described in detail, but the invention is not limited thereto. More specifically, the invention is widely applicable to any other configurations as long as the touch sensor is embedded in the display corresponding to a display section.

Figure 28:
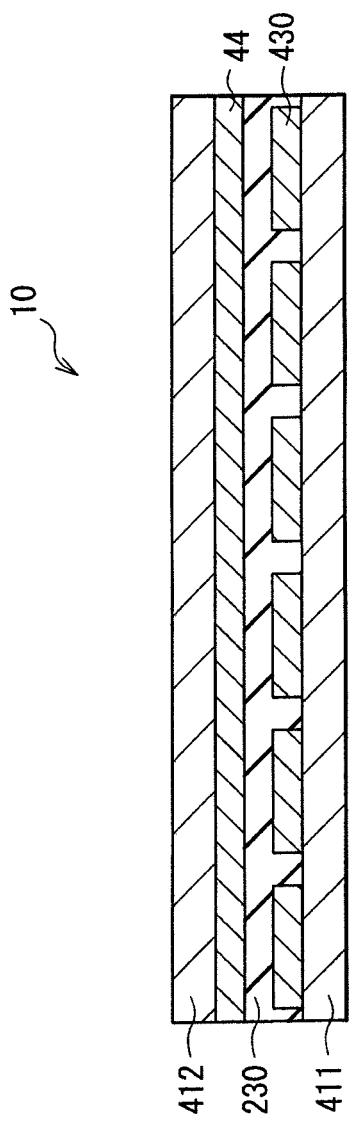
FIG. 28 is a sectional view illustrating a configuration of a main part of a touch sensor according to another modification of the invention.

Further, the touch sensor of the invention is applicable to not only the case where the touch sensor is embedded in the above-described display but also the case where the touch sensor is arranged outside the display (an external touch sensor). More specifically, for example, a touch sensor 10 illustrated in FIG. 28 may be arranged outside the display. The touch sensor 10 includes a pair of insulating substrates 411 and 412 made of, for example, glass or the like, a sensor drive electrode (a touch drive electrode) 430 formed between the substrates 411 and 412, the sensor detection electrode 44 and an insulating layer 230. The sensor drive electrode 430 is formed on the insulating substrate 411, and a touch sensor drive signal is applied to the sensor drive electrode 430. The sensor detection electrode 44 is formed on the insulating substrate 412, and as in the case of the above-described embodiments and the like, the sensor detection electrode 44 is an electrode for obtaining the detection signal Vdet. The insulating layer 230 is formed between the sensor drive electrode 430 and the sensor detection electrode 44. In addition, for example, a perspective configuration of the touch sensor 10 is the same as that in the above-described embodiments and the like as illustrated in FIG. 5 and the like. Moreover, for example, the circuit configurations and the like of the drive signal source S, the detection circuit 8 and the timing control section 9 are the same as those in the above-described embodiments and the like as illustrated in FIG. 8. Also in the touch sensor 10, when the technique in the above-described embodiments and the like is used, a detection operation is allowed to be performed while removing (reducing) an influence of internal noise (in this case, picture noise in a display) or external noise.

In addition, the processes described in the above-described embodiments and the like may be performed by hardware or software. In the case where the processes are performed by software, a program forming the software is installed in a general-purpose computer or the like. Such a program may be stored in a recording medium mounted in the computer in advance.

The present application contains subject matter related to that disclosed in Japanese Priority Patent Application JP 2009-154209 filed in the Japan Patent Office on Jun. 29, 2009, the entire content of which is hereby incorporated by references.

It should be understood by those skilled in the art that various modifications, combinations, sub-combinations and alterations may occur depending on design requirements and other factors insofar as they are within the scope of the appended claims or the equivalents thereof.

What is claimed is:

1. A display comprising:
   a plurality of display pixel electrodes;
   a plurality of common electrodes arranged to face the display pixel electrodes;
   a display layer;
   a display control circuit performing image display control based on an image signal so as to activate the display layer by applying a voltage for display between the display pixel electrodes and the common electrodes;
   a plurality of touch detection electrodes facing the common electrodes or each arranged side by side with each of the common electrodes to form a capacitance between each of the touch detection electrodes and each of the common electrodes; and
   a touch detection circuit detecting an external proximity object based on a detection signal obtained from the touch detection electrodes with use of a common drive voltage for display applied to the common electrodes by the display control circuit as a touch sensor drive signal, wherein the touch detection circuit includes:
   an A/D (analog-digital) converter section performing sampling of a detection signal obtained from each of the touch detection electrodes at three or more different sampling frequencies to produce three or more sampling detection signals, and
   a detection section performing a detection operation based on the three or more sampling detection signals, and further wherein the detection section performs a majority rule operation with the three or more sampling detection signals, and performs a detection operation with use of one sampling detection signal obtained by the majority rule operation.

2. The display according to claim 1, wherein
each of the sampling frequencies is a frequency of N times (N is an integer of 2 or greater) as high as a fundamental frequency of the touch sensor drive signal.

3. The display according to claim 2, wherein
in each of the sampling frequencies, N is a prime number.

4. The display according to claim 2, wherein
the touch detection circuit includes a filter section allowing fundamental detection signals, contained in the respective three or more sampling detection signals and having a frequency same as a fundamental frequency of the touch sensor drive signal, to pass therethrough, and to be supplied to the detection section.

5. The display according to claim 1, wherein
the A/D converter section performs the sampling of the detection signal at a timing other than a generation timing of internal noise caused by a writing operation of an image signal by the display control circuit.

6. The display according to claim 1, wherein
a fundamental frequency of the touch sensor drive signal is lower than an external noise frequency.

7. The display according to claim 1, wherein
a fundamental frequency of the touch sensor drive signal is equal to or lower than 40 kHz.

8. The display according to claim 1, wherein
the common electrodes are a plurality of strip-shaped electrode patterns.

9. The display according to claim 8, wherein
the display control circuit drives and scans the common electrodes in such a manner that a group of electrode patterns selected from the plurality of electrode patterns are driven at a time, while such a selection of the group of electrode patterns is sequentially shifted.

10. The display according to claim 1, comprising:
a circuit substrate in which the display control circuit is formed; and
an opposed substrate arranged to face the circuit substrate, wherein the display pixel electrodes are arranged on a side, facing the opposed substrate, of the circuit substrate,
the common electrodes are arranged on a side facing the circuit substrate of the opposed substrate, and
the display layer is sandwiched between the display pixel electrodes of the circuit substrate and the common electrodes of the opposed substrate.

11. The display according to claim 9, wherein
the display layer is a liquid crystal layer.

12. The display according to claim 1, comprising:
a circuit substrate in which the display control circuit is formed; and
an opposed substrate arranged to face the circuit substrate,
wherein the common electrodes and the display pixel electrodes are laminated in order on the circuit substrate with an insulating layer in between, and
the display layer is sandwiched between the display pixel electrodes of the circuit substrate and the opposed substrate.

13. The display according to claim 11, wherein
the display layer is a liquid crystal layer to perform liquid crystal display in a transverse electric mode.

14. A touch sensor comprising:
a plurality of touch drive electrodes;
a plurality of touch detection electrodes facing the touch drive electrodes or each arranged side by side with each of the touch drive electrodes to form a capacitance between each of the touch detection electrodes and each of the touch drive electrodes; and
a touch detection circuit detecting an external proximity object based on a detection signal obtained from the touch detection electrodes by applying a touch sensor drive signal to the touch drive electrodes,
wherein the touch detection circuit includes:
an A/D (analog-digital) converter section performing sampling of a detection signal obtained from each of the touch detection electrodes at three or more different sampling frequencies to produce three or more sampling detection signals, and, further wherein a detection section performs a majority rule operation with the three or more sampling detection signals, and performs a detection operation with use of one sampling detection signal obtained by the majority rule operation.

15. An electronic unit having a display with a touch sensor, the display comprising:
a plurality of display pixel electrodes;
a plurality of common electrodes arranged to face the display pixel electrodes;
a display layer;
a display control circuit performing image display control based on an image signal so as to activate the display layer by applying a voltage for display between the display pixel electrodes and the common electrodes;
a plurality of touch detection electrodes facing the common electrodes or each arranged side by side with each of the common electrodes to form a capacitance between each of the touch detection electrodes and each of the common electrodes; and
a touch detection circuit detecting an external proximity object based on a detection signal obtained from the touch detection electrodes with use of a common drive voltage for display applied to the common electrodes by the display control circuit as a touch sensor drive signal,
wherein the touch detection circuit includes:
an A/D (analog-digital) converter section performing sampling of a detection signal obtained from each of the touch detection electrodes at three or more different sampling frequencies to produce three or more sampling detection signals, and, further wherein a detection section performs a majority rule operation with the three or more sampling detection signals, and performs a detection operation with use of one sampling detection signal obtained by the majority rule operation.

* * * * *